(12) United States Patent
Hsueh et al.

(10) Patent No.: US 10,670,838 B2
(45) Date of Patent: Jun. 2, 2020

(54) IMAGE CAPTURING OPTICAL LENS ASSEMBLY, IMAGE CAPTURING DEVICE AND ELECTRONIC DEVICE

(71) Applicant: LARGAN PRECISION CO., LTD., Taichung (TW)

(72) Inventors: Chun-Che Hsueh, Taichung (TW); Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 16/135,167

(22) Filed: Sep. 19, 2018

(65) Prior Publication Data

US 2019/0018224 A1    Jan. 17, 2019

Related U.S. Application Data

(63) Continuation of application No. 15/497,385, filed on Apr. 26, 2017, now Pat. No. 10,107,991, which is a (Continued)

(30) Foreign Application Priority Data

Dec. 5, 2014   (TW) .............................. 103142323 A

(51) Int. Cl.
*G02B 9/62*     (2006.01)
*G02B 13/18*    (2006.01)
(Continued)

(52) U.S. Cl.
CPC ......... *G02B 13/0045* (2013.01); *G02B 5/208* (2013.01); *G02B 9/62* (2013.01)

(58) Field of Classification Search
None
See application file for complete search history.

(56) References Cited

U.S. PATENT DOCUMENTS

| 6,028,717 A | 2/2000 | Kohno et al. |
| 8,743,483 B2 | 6/2014 | Hsu et al. |
| (Continued) | | |

FOREIGN PATENT DOCUMENTS

| JP | H11002762 | 1/1999 |
| WO | 2015060166 A1 | 4/2015 |

*Primary Examiner* — Darryl J Collins
(74) *Attorney, Agent, or Firm* — Locke Lord LLP; Tim Tingkang Xia, Esq.

(57) ABSTRACT

This disclosure provides an image capturing optical lens assembly including, in order from an object side to an image side: a first lens element with refractive power having an object-side surface being convex in a paraxial region thereof; a second lens element having positive refractive power; a third lens element with refractive power having an image-side surface being concave in a paraxial region thereof; a fourth lens element with refractive power having an image-side surface being concave in a paraxial region thereof, wherein both surfaces thereof being aspheric; a fifth lens element with refractive power having an object-side surface being concave in a paraxial region thereof; and a sixth lens element with refractive power having an image-side surface being concave in a paraxial region thereof, wherein both surfaces thereof being aspheric, and the image-side surface having at least one convex shape in an off-axis region thereof.

26 Claims, 21 Drawing Sheets

Related U.S. Application Data continuation of application No. 14/671,426, filed on Mar. 27, 2015, now Pat. No. 9,671,588.

(51) Int. Cl.
*G02B 13/00* (2006.01)
*G02B 5/20* (2006.01)

(56) References Cited

U.S. PATENT DOCUMENTS

| | | |
|---|---|---|
| 9,046,672 B2 * | 6/2015 | You ............... G02B 13/0045 |
| 2014/0376107 A1 | 12/2014 | Son |
| 2015/0015765 A1 * | 1/2015 | Lee ............... G02B 27/646 |
| | | 348/335 |
| 2016/0147044 A1 | 5/2016 | Kondo |
| 2016/0161719 A1 | 6/2016 | Son |

* cited by examiner

IMAGE CAPTURING OPTICAL LENS ASSEMBLY, IMAGE CAPTURING DEVICE AND ELECTRONIC DEVICE

RELATED APPLICATIONS

This application is a continuation application of U.S. application Ser. No. 15/497,385 filed on Apr. 26, 2017, now approved, which is a continuation application of U.S. application Ser. No. 14/671,426 filed on Mar. 27, 2015, now patented and claims priority to Taiwan Application Serial Number 103142323, filed Dec. 5, 2014, which is incorporated by reference herein in its entirety.

BACKGROUND

Technical Field

The present disclosure relates to an image capturing optical lens assembly and an image capturing device, and more particularly, to an image capturing optical lens assembly and an image capturing device applicable to electronic devices.

Description of Related Art

As personal electronic products have been becoming more and more compact, the internal components of the electronic products are also required to be smaller in size than before, resulting in an increasing demand for compact optical systems. In addition to the demand of miniaturization, the reduction of the pixel size of sensors in the advanced semiconductor manufacturing technologies has enabled optical systems to evolve toward the field of higher megapixels. Meanwhile, the popularity of smart phones and tablet computers greatly boost the need for compact optical systems featuring high image quality.

A conventional compact optical system is usually configured to have a positive first lens element and a negative second lens element. However, the arrangement of greater refractive power for the first two lens elements at the light incident side usually increases the sensitivity of the system and adversely affects the manufacturing yield rate.

Therefore, a need exists in the art for an optical system that features compact size, high image quality, improved manufacturing yield rate and appropriate sensitivity.

SUMMARY

According to one aspect of the present disclosure, an image capturing optical lens assembly includes, in order from an object side to an image side: a first lens element with refractive power having an object-side surface being convex in a paraxial region thereof, a second lens element having positive refractive power; a third lens element with refractive power having an image-side surface being concave in a paraxial region thereof, a fourth lens element with refractive power having an image-side surface being concave in a paraxial region thereof, wherein an object-side surface and the image-side surface thereof being aspheric; a fifth lens element with refractive power having an object-side surface being concave in a paraxial region thereof, and a sixth lens element with refractive power having an image-side surface being concave in a paraxial region thereof, and an object-side surface and the image-side surface thereof being aspheric, wherein the image-side surface having at least one convex shape in an off-axis region thereof, wherein the image capturing optical lens assembly has a total of six lens elements with refractive power and further includes a stop between an imaged object and the third lens element; wherein a focal length of the image capturing optical lens assembly is f, a focal length of the fifth lens element is f5, a focal length of the sixth lens element is f6, a focal length of the second lens element is f2, a focal length of the third lens element is f3, a curvature radius of the object-side surface of the first lens element is R1, and the following conditions are satisfied:

$1.50 < |f/f5| + |f/f6|;$ $2.20 < |f/f2| + |f/f3|;$ and $|R1/f| < 1.50.$

According to another aspect of the present disclosure, an image capturing optical lens assembly includes, in order from an object side to an image side: a first lens element with negative refractive power having an object-side surface being convex in a paraxial region thereof and an image-side surface being concave in a paraxial region thereof; a second lens element having positive refractive power; a third lens element with negative refractive power having an image-side surface being concave in a paraxial region thereof; a fourth lens element with refractive power having an object-side surface and an image-side surface thereof being aspheric; a fifth lens element having refractive power; and a sixth lens element with refractive power having an image-side surface being concave in a paraxial region thereof, wherein an object-side surface and the image-side surface thereof being aspheric, and the image-side surface having at least one convex shape in an off-axis region thereof; wherein the image capturing optical lens assembly has a total of six lens elements with refractive power and further includes a stop between an imaged object and the third lens element; wherein a focal length of the image capturing optical lens assembly is f, a focal length of the fifth lens element is f5, a focal length of the sixth lens element is f6, a curvature radius of the object-side surface of the first lens element is R1, and the following conditions are satisfied:

$1.50 < |f/f5| + |f/f6|;$ and $|R1/f| < 1.50.$

According to another aspect of the present disclosure, an image capturing optical lens assembly includes, in order from an object side to an image side: a first lens element with positive refractive power having an object-side surface being convex in a paraxial region thereof; a second lens element having positive refractive power; a third lens element having refractive power; a fourth lens element with refractive power having an image-side surface being concave in a paraxial region thereof, wherein an object-side surface and the image-side surface thereof being aspheric; a fifth lens element with refractive power having an object-side surface being concave in a paraxial region thereof; and a sixth lens element with refractive power having an image-side surface being concave in a paraxial region thereof, wherein an object-side surface and the image-side surface thereof being aspheric, and the image-side surface having at least one convex shape in an off-axis region thereof; wherein the image capturing optical lens assembly has a total of six lens elements with refractive power and further includes a stop between an imaged object and the third lens element; wherein a focal length of the image capturing optical lens assembly is f, a focal length of the second lens element is f2, a focal length of the third lens element is f3, and the following condition is satisfied:

$2.20 < |f/f2| + |f/f3|.$

According to another aspect of the present disclosure, an image capturing device includes the aforementioned image capturing optical lens assembly and an image sensor.

According to another aspect of the present disclosure, an electronic device includes the aforementioned image capturing device.

DETAILED DESCRIPTION

Figure 1A:
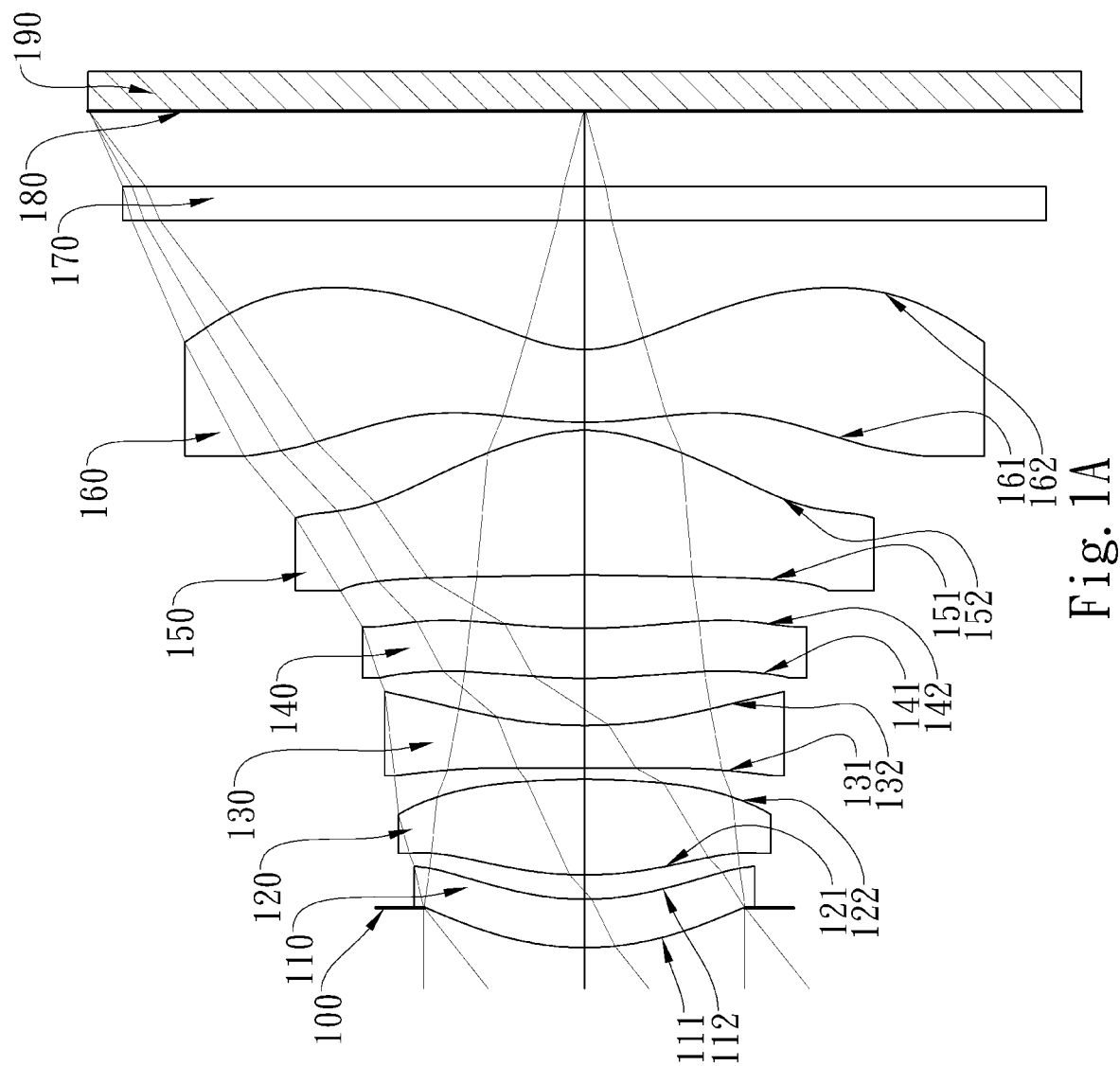
FIG. 1A is a schematic view of an image capturing device according to the 1st embodiment of the present disclosure.

The present disclosure provides an image capturing optical lens assembly including, in order from an object side to an image side, a first lens element, a second lens element, a third lens element, a fourth lens element, a fifth lens element, and a sixth lens element, wherein the image capturing optical lens assembly has a total of six lens elements with refractive power and further includes a stop, such as an aperture stop. The stop is between an imaged object and the third lens element.

The first lens element may have negative refractive power so as to favorably enlarge the field of view of the image capturing optical lens assembly. Alternatively, the first lens element may have positive refractive power, so that it provides the image capturing optical lens assembly with part of refractive power as it needs to be so as to favorably reduce the total track length of the image capturing optical lens assembly. The object-side surface of the first lens element is convex in a paraxial region thereof, and the image-side surface of the first lens element is concave in a paraxial region thereof so as to correct the astigmatism of the image capturing optical lens assembly.

The second lens element may have positive refractive power, so that it is favorable for distributing the refractive power of the first lens element and thereby to favorably reduce the photosensitivity of the image capturing optical lens assembly. The object-side surface of the second lens element may be convex in a paraxial region thereof so as to enhance the capability of correcting the astigmatism.

The third lens element may have negative refractive power, which together with the positive refractive power of the second lens element can mitigate the deflection of light incident to the image capturing optical lens assembly to control the aberration and to reduce the sensitivity of the image capturing optical lens assembly, thereby improving the manufacturing yield rate. The object-side surface of the third lens element may be concave in a paraxial region thereof, and the image-side surface of the third lens element is concave in a paraxial region thereof so as to favorably correct the aberration of the image capturing optical lens assembly. The object-side surface of the third lens element may have at least one inflection point so as to effectively correct the aberration of the off-axis field.

The object-side surface of the fourth lens element may be convex in a paraxial region thereof, and the image-side surface of the fourth lens element is concave in a paraxial region thereof so as to effectively correct the astigmatism of the image capturing optical lens assembly and to effectively mitigate the variation in the shape of the fourth lens element, thereby facilitating the formation of the fourth lens element. The image-side surface of the fourth lens element has at least one convex shape in an off-axis region thereof so as to favorably correct the aberration of the off-axis field.

The fifth lens element may have positive refractive power, so that it is favorable for balancing the distribution of the positive refractive power. The object-side surface of the fifth lens element may be concave in a paraxial region thereof, and the image-side surface of the fifth lens element may be convex in a paraxial region thereof so that the capability of correcting the astigmatism is enhanced The sixth lens element may have negative refractive power, so that it is favorable for the distribution of the negative refractive power of the image capturing optical lens assembly. The image-side surface of the sixth lens element is concave in a paraxial region thereof; this allows the principal point of the image capturing optical lens assembly to be placed away from the image surface, thereby reducing the total track length of the image capturing optical lens assembly. The image-side surface of the sixth lens element has at least one convex shape in an off-axis region thereof so as to effectively correct the aberration of the off-axis field.

When a focal length of the image capturing optical lens assembly is f, a focal length of the fifth lens element is f5, a focal length of the sixth lens element is f6, and the following condition is satisfied: $1.50 < |f/f5| + |f/f6|$, the distribution of the refractive power of the image capturing optical lens assembly is more balanced and thereby to reduce the sensitivity of the image capturing optical lens assembly. Preferably, the following condition is satisfied: $2.50 < |f/f5| + |f/f6| < 5.0$.

When the focal length of the image capturing optical lens assembly is f, a focal length of the second lens element is f2, a focal length of the third lens element is f3, and the following condition is satisfied: $2.20 < |f/f2| + |f/f3|$, the deflection of light incident to the image capturing optical lens assembly can be mitigated to control the aberration and reduce the sensitivity of the image capturing optical lens assembly, thereby improving the manufacturing yield rate.

When a curvature radius of the object-side surface of the first lens element is R1, the focal length of the image capturing optical lens assembly is f, and the following condition is satisfied: $|R1/f| < 1.50$, it is favorable for reducing the sensitivity of the image capturing optical lens assembly. Preferably, the following condition is satisfied: $|R1/f| < 0.75$.

When a central thickness of the second lens element is CT2, an axial distance between the first lens element and the second lens element is T12, an axial distance between the second lens element and the third lens element is T23, and the following condition is satisfied: $2.4 < CT2/(T12+T23) < 5.0$, the thickness of the second lens element and the axial distances between the first lens element, the second lens element and the third lens element will be more appropriate. Such an arrangement facilitates controlling the thickness of the second lens element and preventing the total track length of the image capturing optical lens assembly from being too long, and this is favorable for assembling and manufacturing lens elements.

When the focal length of the image capturing optical lens assembly is f, a curvature radius of the object-side surface of the second lens element is R3, and the following condition is satisfied: $1.40 < f/R3$, the sensitivity of the image capturing optical lens assembly can be effectively corrected and this is favorable for manufacturing yield rate.

When the focal length of the image capturing optical lens assembly is f, a curvature radius of the image-side surface of the sixth lens element is R12, and the following condition is satisfied: $0 < R12/f < 0.40$, the incident angle of the light projecting onto an image sensor from the image capturing optical lens assembly can be favorably suppressed to increase the photosensitivity of the image capturing optical lens assembly.

When an Abbe number of the fifth lens element is V5, an Abbe number of the third lens element is V3, an Abbe number of the fourth lens element is V4, and the following condition is satisfied: $1.0 < V5/(V3+V4) < 1.5$, the chromatic aberration in the image capturing optical lens assembly can be effectively corrected.

When an f-number of the image capturing optical lens assembly is Fno, and the following condition is satisfied: $1.6 < Fno < 2.5$, the ambient illuminance of the image capturing optical lens assembly can be favorably increased.

When a central thickness of the first lens element is CT1, a distance in parallel with an optical axis from an axial vertex on the image-side surface of the first lens element to a maximum effective radius position on the image-side surface of the first lens element is Sag12, and the following condition is satisfied: $CT1/|Sag12| < 2.5$, it is favorable for the reduction of the sensitivity of the image capturing optical lens assembly and the manufacturing yield rate.

When a central thickness of the fifth lens element is CT5, a central thickness of the sixth lens element is CT6, and the following condition is satisfied: $0.80 < CT5/CT6$, the thickness of the lens elements is more appropriate, and this is favorable for manufacturing and assembling lens elements.

According to the image capturing optical lens assembly of the present disclosure, the lens elements thereof can be made of glass or plastic material. When the lens elements are made of glass material, the distribution of the refractive power of the image capturing optical lens assembly may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical surfaces so as to have more controllable variables for eliminating the aberration thereof and to further decrease the required number of the lens elements, the total track length of the image capturing optical lens assembly can be effectively reduced.

According to the image capturing optical lens assembly of the present disclosure, the image capturing optical lens assembly can include at least one stop, such as an aperture stop, a glare stop or a field stop.

According to the image capturing optical lens assembly of the present disclosure, a stop can be configured as a front stop or a middle stop. A front stop disposed between an imaged object and the first lens element can provide a longer distance between an exit pupil of the image capturing optical lens assembly and the image surface and thereby to improve the image-sensing efficiency of an image sensor, such as a CCD or CMOS sensor. A middle stop disposed between the first lens element and the image surface is favorable for enlarging the field of view of the image capturing optical lens assembly and thereby to provide a wider field of view for the same.

According to the image capturing optical lens assembly of the present disclosure, when the lens element has a convex surface and the region of convex shape is not defined, it indicates that the surface is convex in the paraxial region thereof; when the lens element has a concave surface and the region of concave shape is not defined, it indicates that the surface is concave in the paraxial region thereof. Likewise, when the region of refractive power or focal length of a lens element is not defined, it indicates that the region of refractive power or focal length of the lens element is in the paraxial region thereof.

According to the image capturing optical lens assembly of the present disclosure, an image surface of the image capturing optical lens assembly, based on the corresponding image sensor, can be a plane or a curved surface with any curvature, especially a curved surface being concave facing towards the object side.

The image capturing optical lens assembly of the present disclosure can be optionally applied to moving focus optical systems. According to the image capturing optical lens assembly of the present disclosure, the image capturing optical lens assembly features good correction capability and high image quality, and can be applied to 3D (three-dimensional) image capturing applications and electronic devices, such as digital cameras, mobile devices, digital tablets, smart TV, wireless monitoring device, motion sensing input device, driving recording system, rear view camera system, and wearable devices.

According to the present disclosure, an image capturing device includes the aforementioned image capturing optical lens assembly and an image sensor, wherein the image sensor is disposed on or near an image surface of the image capturing optical lens assembly. Therefore, the design of the image capturing optical lens assembly enables the image capturing device to achieve the best image quality. Preferably, the image capturing device can further include a barrel member, a holding member or a combination thereof.

Figure 10A:
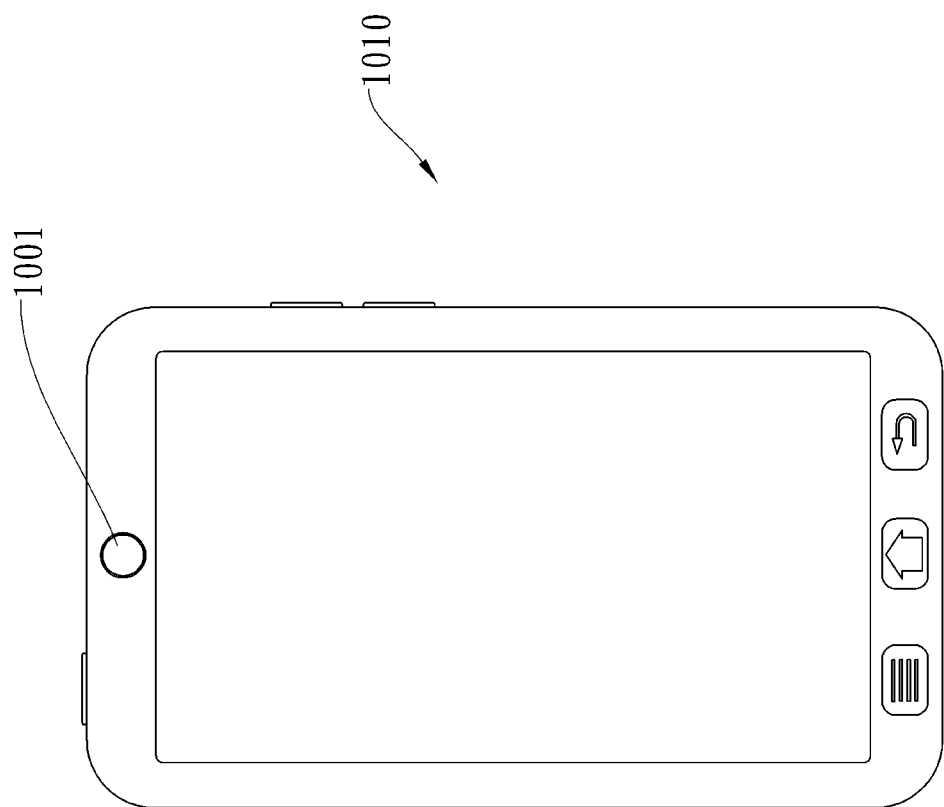
FIG. 10A shows a smart phone with an image capturing device of the present disclosure installed therein.
Figure 10B:
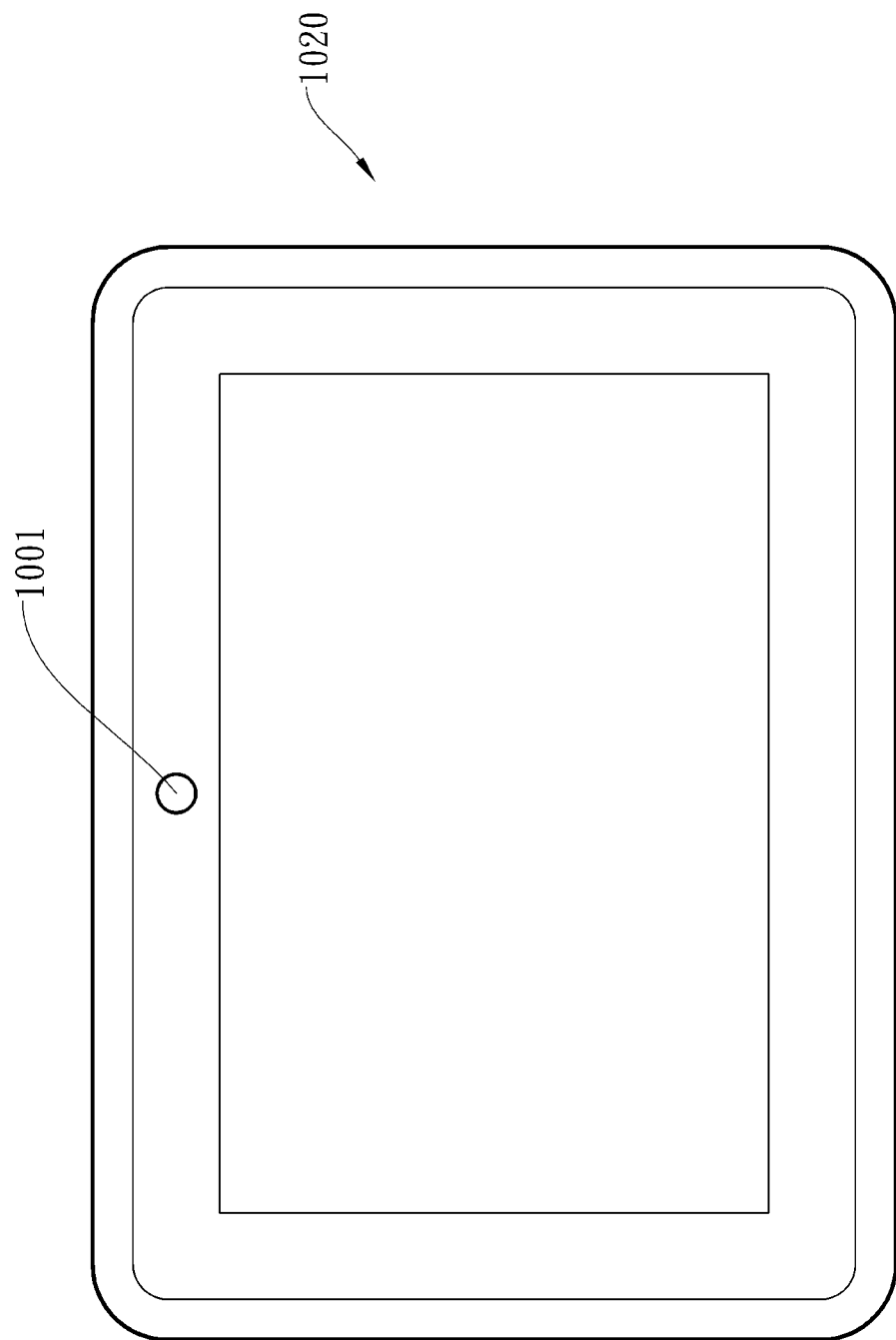
FIG. 10B shows a tablet personal computer with an image capturing device of the present disclosure installed therein.
Figure 10C:
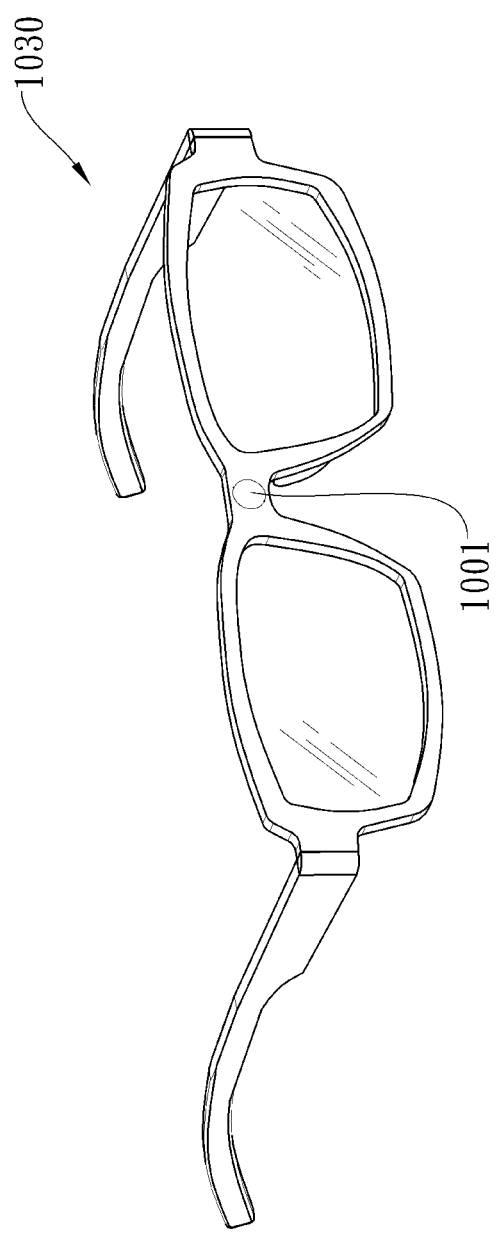
FIG. 10C shows a wearable device with an image capturing device of the present disclosure installed therein.

Referring to FIG. 10A, FIG. 10B and FIG. 10C, an image capturing device 1001 may be installed in an electronic device, including, but not limited to, a smart phone 1010, a tablet personal computer 1020 or a wearable device 1030. The three exemplary figures of different kinds of electronic devices are only exemplary for showing the image capturing device of present disclosure installed in an electronic device and are not limited thereto. Preferably, the electronic device can further include a control unit, a display unit, a storage unit, a random access memory unit (RAM) or a combination thereof.

According to the above description of the present disclosure, the following 1st-9th specific embodiments are provided for further explanation.

1st Embodiment

Figure 1B:
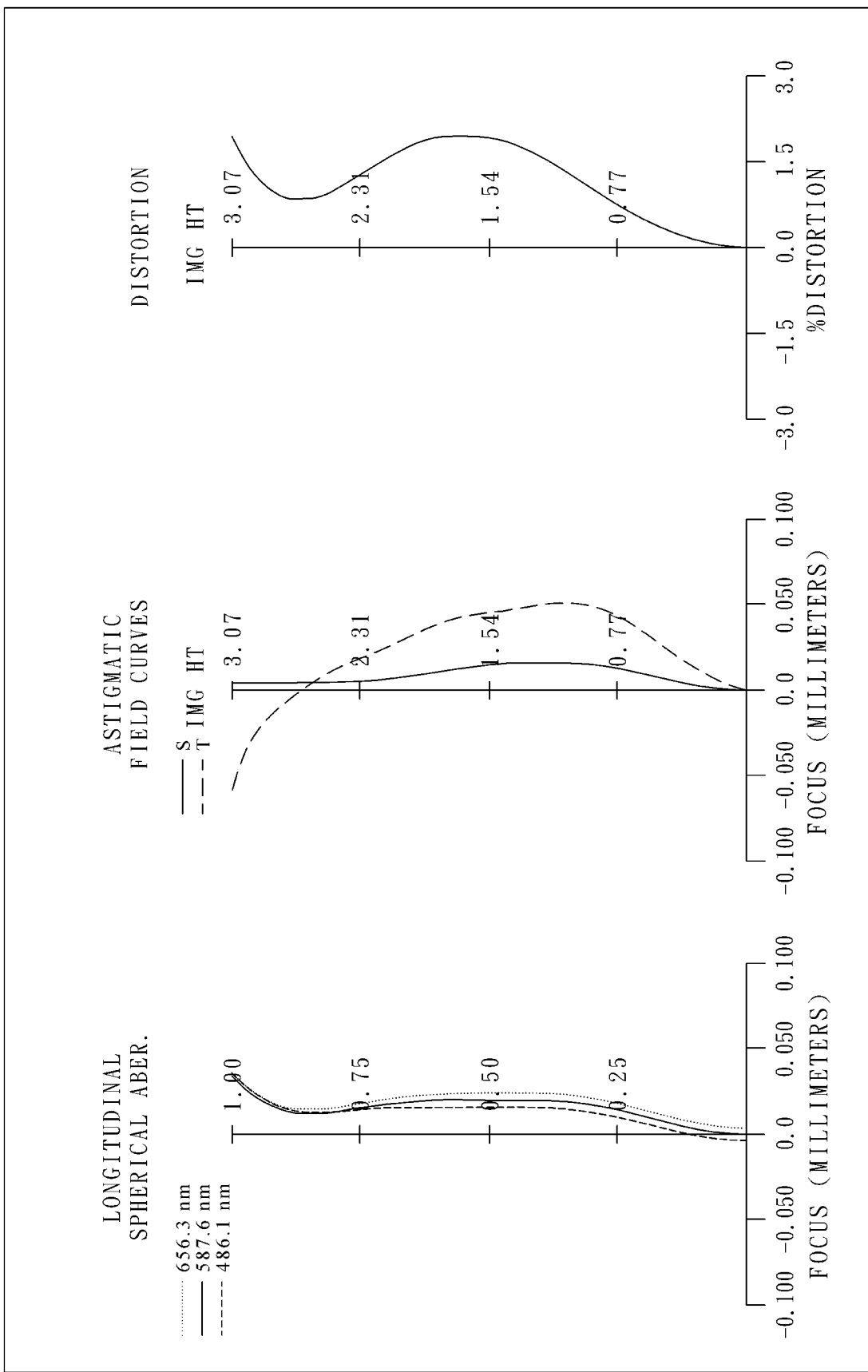
FIG. 1B shows longitudinal spherical aberration curves, astigmatic field curves and a distortion curve of the image capturing device according to the 1st embodiment.

FIG. 1A is a schematic view of an image capturing device according to the 1st embodiment of the present disclosure. FIG. 1B shows, in order from left to right, longitudinal spherical aberration curves, astigmatic field curves and a distortion curve of the image capturing device according to the 1st embodiment.

In FIG. 1A, the image capturing device includes an image capturing optical lens assembly (not otherwise herein labeled) of the present disclosure and an image sensor 190. The image capturing optical lens assembly includes, in order from an object side to an image side, a first lens element 110, a second lens element 120, a third lens element 130, a fourth lens element 140, a fifth lens element 150, and a sixth lens element 160, wherein the image capturing optical lens assembly has a total of six lens elements (110-160) with refractive power.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with positive refractive power has an object-side surface 121 being convex in a paraxial region thereof and an image-side surface 122 being convex in a paraxial region thereof, which are both aspheric, and the second lens element 120 is made of plastic material.

The third lens element 130 with negative refractive power has an object-side surface 131 being concave in a paraxial region thereof and an image-side surface 132 being concave in a paraxial region thereof, which are both aspheric, and the third lens element 130 is made of plastic material. Furthermore, the object-side surface 131 of the third lens element 130 has at least one inflection point.

The fourth lens element 140 with negative refractive power has an object-side surface 141 being convex in a paraxial region thereof and an image-side surface 142 being concave in a paraxial region thereof, which are both aspheric, and the fourth lens element 140 is made of plastic material. Furthermore, the image-side surface 142 of the fourth lens element 140 has at least one convex shape in an off-axis region thereof.

The fifth lens element 150 with positive refractive power has an object-side surface 151 being concave in a paraxial region thereof and an image-side surface 152 being convex in a paraxial region thereof, which are both aspheric, and the fifth lens element 150 is made of plastic material.

The sixth lens element 160 with negative refractive power has an object-side surface 161 being convex in a paraxial region thereof and an image-side surface 162 being concave in a paraxial region thereof, which are both aspheric, and the sixth lens element 160 is made of plastic material. Furthermore, the image-side surface 162 of the sixth lens element 160 has at least one convex shape in an off-axis region thereof.

The image capturing optical lens assembly further includes an aperture stop 100 and an IR-cut filter 170. The aperture stop 100 is disposed between an imaged object and the first lens element 110. The IR-cut filter 170 is made of glass and located between the sixth lens element 160 and an image surface 180, and will not affect the focal length of the image capturing optical lens assembly.

The image sensor 190 is disposed on or near the image surface 180 of the image capturing optical lens assembly.

The equation of the aspheric surface profiles is expressed as follows:

$$X(Y) = (Y^2/R)/(1 + sqrt(1 - (1+k)*(Y/R)^2)) + \sum_{i}(Ai)*(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the first embodiment, a focal length of the image capturing optical lens assembly is f, an f-number of the image capturing optical lens assembly is Fno, half of maximal field of view of the image capturing optical lens assembly is HFOV, and these parameters have the following values: f=3.78 mm; Fno=1.90; and HFOV=38.5 degrees.

In the first embodiment, an Abbe number of the fifth lens element 150 is V5, an Abbe number of the third lens element 130 is V3, an Abbe number of the fourth lens element 140 is V4, and they satisfy the condition: V5/(V3+V4)=1.19.

In the first embodiment, a central thickness of the second lens element 120 is CT2, an axial distance between the first lens element 110 and the second lens element 120 is T12, an axial distance between the second lens element 120 and the third lens element 130 is T23, and they satisfy the condition: CT2/(T12+T23)=2.70.

In the first embodiment, a central thickness of the fifth lens element 150 is CT5, a central thickness of the sixth lens element 160 is CT6, and they satisfy the condition: CT5/CT6=1.99.

In the first embodiment, a central thickness of the first lens element 110 is CT1, a distance in parallel with an optical axis from an axial vertex on the image-side surface 112 of the first lens element 110 to a maximum effective radius position on the image-side surface 112 of the first lens element 110 is Sag12, and they satisfy the condition: CT1/|Sag12|=1.47.

In the first embodiment, a curvature radius of the object-side surface 111 of the first lens element 110 is R1, a focal length of the image capturing optical lens assembly is f, and they satisfy the condition: |R1/f|=0.46.

In the first embodiment, the focal length of the image capturing optical lens assembly is f, a curvature radius of the object-side surface 121 of the second lens element 120 is R3, and they satisfy the condition: f/R3=1.77.

In the first embodiment, a curvature radius of the image-side surface 162 of the sixth lens element 160 is R12, the focal length of the image capturing optical lens assembly is f, and they satisfy the condition: R12/f=0.20.

In the first embodiment, the focal length of the image capturing optical lens assembly is f, a focal length of the second lens element 120 is f2, a focal length of the third lens element 130 is f3, and they satisfy the condition: |f/f2|+|f/f3|=2.28.

In the first embodiment, the focal length of the image capturing optical lens assembly is f, a focal length of the fifth lens element 150 is f5, a focal length of the sixth lens element 160 is f6, and they satisfy the condition: |f/f5|+|f/f6|=3.61.

The detailed optical data of the first embodiment are shown in TABLE 1, and the aspheric surface data are shown in TABLE 2, wherein the units of the curvature radius, the thickness and the focal length are expressed in mm, and HFOV is half of the maximal field of view.

TABLE 1

(Embodiment 1)
f = 3.78 mm, Fno = 1.90, HFOV = 38.5 deg.

| Surface # | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.247 | | | | |
| 2 | Lens 1 | 1.755 | ASP | 0.300 | Plastic | 1.544 | 55.9 | 419.65 |
| 3 | | 1.662 | ASP | 0.151 | | | | |
| 4 | Lens 2 | 2.133 | ASP | 0.594 | Plastic | 1.544 | 55.9 | 2.78 |
| 5 | | −4.662 | ASP | 0.069 | | | | |
| 6 | Lens 3 | −38.635 | ASP | 0.265 | Plastic | 1.639 | 23.5 | −4.12 |
| 7 | | 2.830 | ASP | 0.293 | | | | |
| 8 | Lens 4 | 3.671 | ASP | 0.310 | Plastic | 1.633 | 23.4 | −843.52 |
| 9 | | 3.527 | ASP | 0.330 | | | | |
| 10 | Lens 5 | −12.309 | ASP | 0.899 | Plastic | 1.544 | 55.9 | 2.02 |
| 11 | | −1.035 | ASP | 0.050 | | | | |
| 12 | Lens 6 | 2.468 | ASP | 0.451 | Plastic | 1.544 | 55.9 | −2.18 |
| 13 | | 0.750 | ASP | 0.800 | | | | |
| 14 | IR-cut filter | Plano | | 0.210 | Glass | 1.517 | 64.2 | |
| 15 | | Plano | | 0.470 | | | | |
| 16 | Image Surface | Plano | | — | | | | |

Note:
Reference Wavelength is d-line 587.6 nm

TABLE 2

| Aspheric Coefficients | | | | | | |
|---|---|---|---|---|---|---|
| Surface # | 2 | 3 | 4 | 5 | 6 | 7 |
| k = | −5.8403E−01 | −1.7275E+00 | −7.6830E+00 | −9.0000E+01 | 8.9992E+01 | 3.1605E+00 |
| A4 = | −4.1244E−02 | −8.7529E−02 | 1.2639E−02 | −2.1623E−03 | 1.3639E−01 | 3.8318E−03 |
| A6 = | 8.8742E−03 | 4.0028E−02 | −5.2013E−02 | −1.9764E−01 | −4.2352E−01 | −1.1664E−01 |
| A8 = | 6.8214E−03 | −3.6180E−02 | −1.4139E−02 | 1.7852E−01 | 4.5265E−01 | 1.0855E−01 |
| A10 = | −1.5515E−02 | | 9.2136E−03 | −5.4540E−02 | −2.1953E−01 | −5.8999E−02 |
| A12 = | | | | | 4.0773E−02 | 1.1469E−02 |

| Surface # | 8 | 9 | 10 | 11 | 12 | 13 |
|---|---|---|---|---|---|---|
| k = | −5.9209E+01 | −1.8336E+01 | −3.3470E+00 | −5.5845E+00 | −2.4679E−01 | −4.3394E+00 |
| A4 = | −2.1805E−02 | −7.9011E−02 | 7.7778E−02 | −5.0173E−02 | −2.1999E−01 | −9.0041E−02 |
| A6 = | −3.2370E−02 | 3.1538E−02 | −1.2567E−01 | 1.4292E−02 | 6.7649E−02 | 3.2227E−02 |
| A8 = | 4.3459E−03 | −2.1342E−02 | 1.3643E−01 | 9.6967E−03 | −1.0551E−02 | −8.5109E−03 |
| A10 = | 1.3091E−02 | −1.4490E−02 | −9.6542E−02 | −9.4547E−04 | 9.7036E−04 | 1.3883E−03 |
| A12 = | −5.2554E−03 | 2.1447E−02 | 3.6315E−02 | −1.0958E−03 | −7.6596E−05 | −1.3093E−04 |
| A14 = | | −5.3783E−03 | −5.4872E−03 | 1.8051E−04 | 4.1836E−06 | 5.5499E−06 |

2nd Embodiment

Figure 2A:
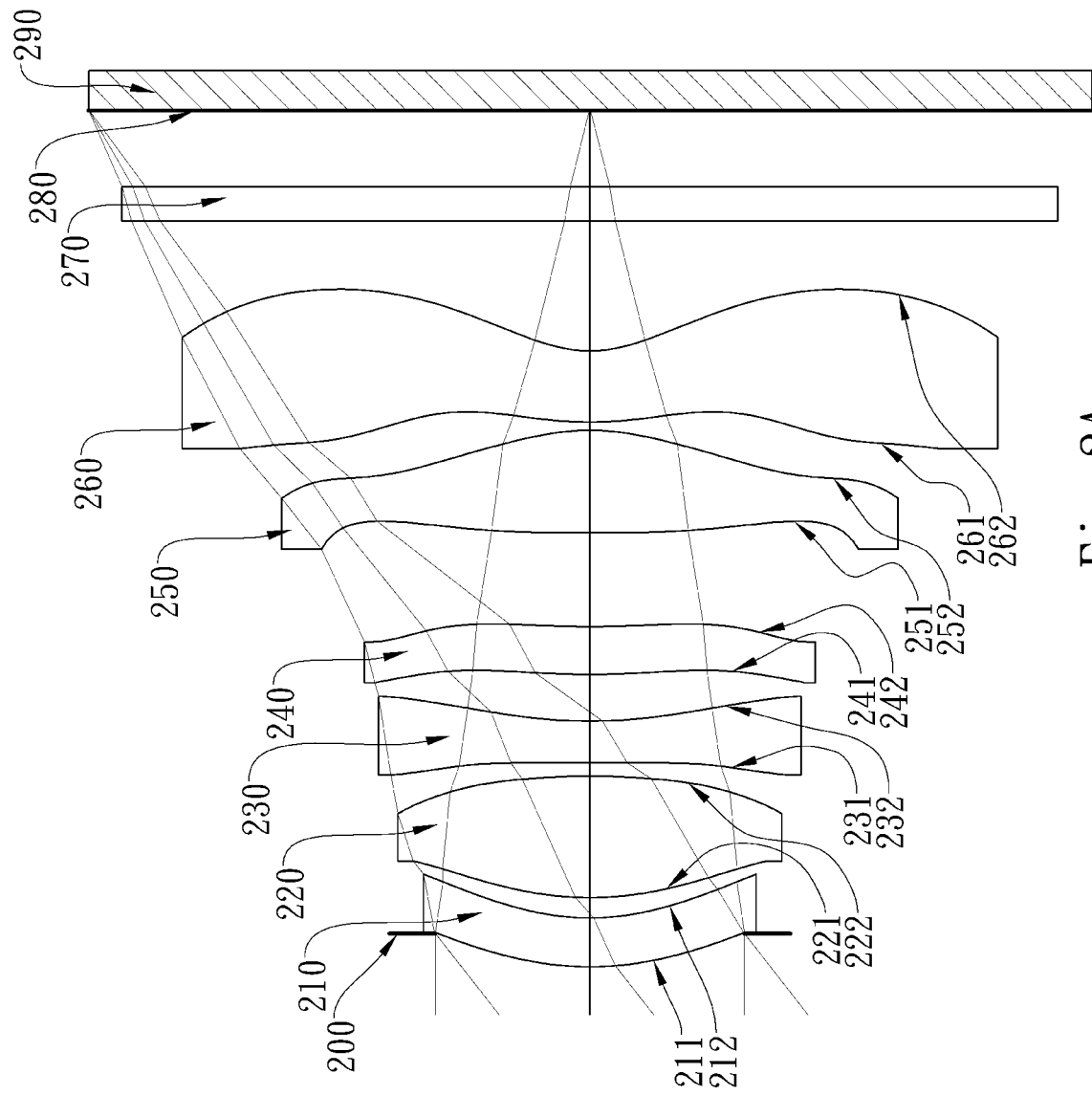
FIG. 2A is a schematic view of an image capturing device according to the 2nd embodiment of the present disclosure.
Figure 2B:
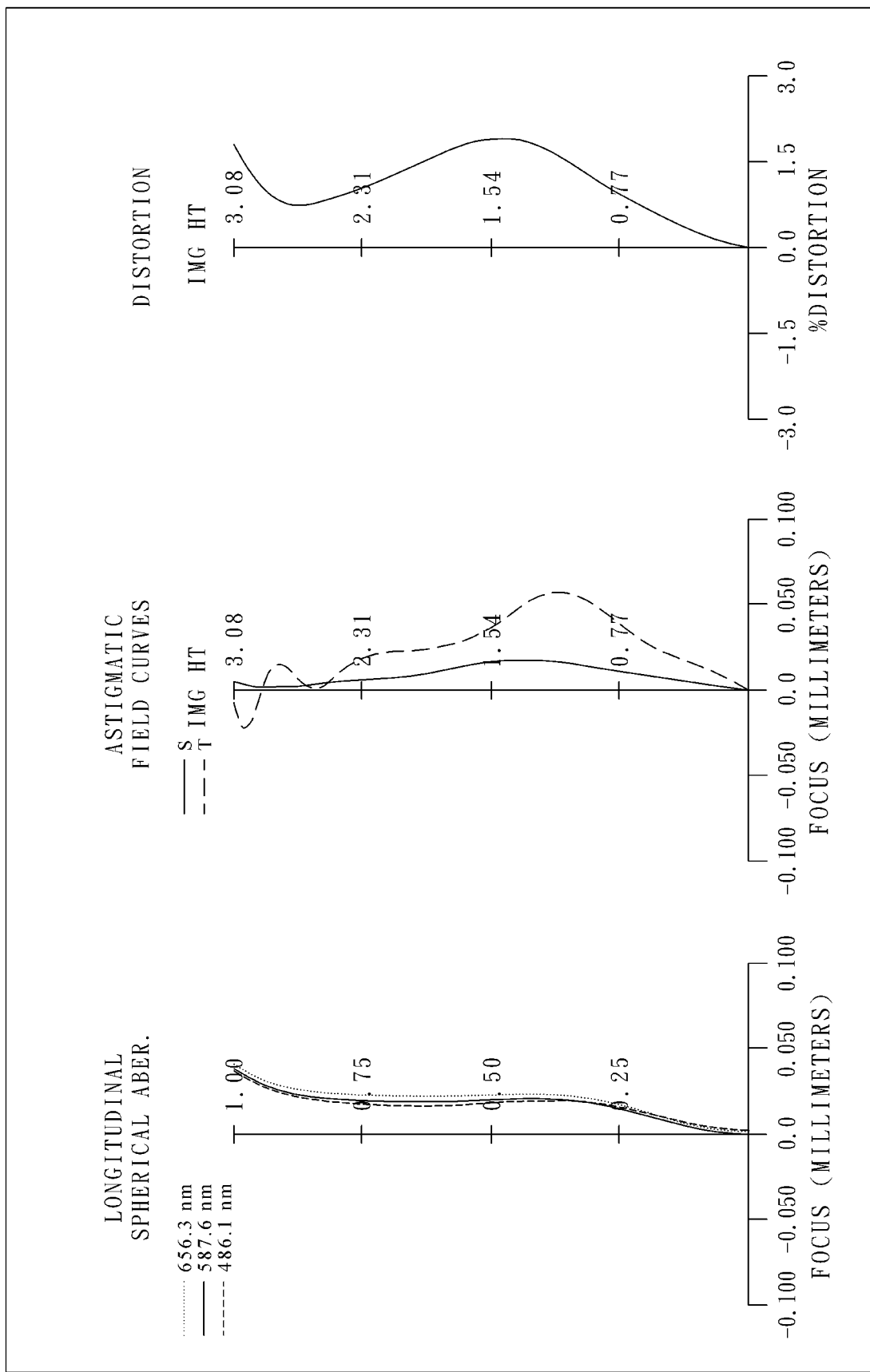
FIG. 2B shows longitudinal spherical aberration curves, astigmatic field curves and a distortion curve of the image capturing device according to the 2nd embodiment.

FIG. 2A is a schematic view of an image capturing device according to the 2nd embodiment of the present disclosure. FIG. 2B shows, in order from left to right, longitudinal spherical aberration curves, astigmatic field curves and a distortion curve of the image capturing device according to the 2nd embodiment.

In FIG. 2A, the image capturing device includes an image capturing optical lens assembly (not otherwise herein labeled) of the present disclosure and an image sensor 290. The image capturing optical lens assembly includes, in order from an object side to an image side, a first lens element 210, a second lens element 220, a third lens element 230, a fourth lens element 240, a fifth lens element 250, and a sixth lens element 260, wherein the image capturing optical lens assembly has a total of six lens elements (210-260) with refractive power.

The first lens element 210 with negative refractive power has an object-side surface 211 being convex in a paraxial region thereof and an image-side surface 212 being concave in a paraxial region thereof, which are both aspheric, and the first lens element 210 is made of plastic material.

The second lens element 220 with positive refractive power has an object-side surface 221 being convex in a paraxial region thereof and an image-side surface 222 being convex in a paraxial region thereof, which are both aspheric, and the second lens element 220 is made of plastic material.

The third lens element 230 with negative refractive power has an object-side surface 231 being concave in a paraxial region thereof and an image-side surface 232 being concave in a paraxial region thereof, which are both aspheric, and the third lens element 230 is made of plastic material. Furthermore, the object-side surface 231 of the third lens element 230 has at least one inflection point.

The fourth lens element 240 with positive refractive power has an object-side surface 241 being convex in a paraxial region thereof and an image-side surface 242 being concave in a paraxial region thereof, which are both aspheric, and the fourth lens element 240 is made of plastic material. Furthermore, the image-side surface 242 of the fourth lens element 240 has at least one convex shape in an off-axis region thereof.

The fifth lens element 250 with positive refractive power has an object-side surface 251 being convex in a paraxial region thereof and an image-side surface 252 being convex in a paraxial region thereof, which are both aspheric, and the fifth lens element 250 is made of plastic material.

The sixth lens element 260 with negative refractive power has an object-side surface 261 being convex in a paraxial region thereof and an image-side surface 262 being concave in a paraxial region thereof, which are both aspheric, and the sixth lens element 260 is made of plastic material. Furthermore, the image-side surface 262 of the sixth lens element 260 has at least one convex shape in an off-axis region thereof.

The image capturing optical lens assembly further includes an aperture stop 200 and an IR-cut filter 270. The aperture stop 200 is disposed between an imaged object and the first lens element 210. The IR-cut filter 270 is made of glass and located between the sixth lens element 260 and an image surface 280, and will not affect the focal length of the image capturing optical lens assembly.

The image sensor 290 is disposed on or near the image surface 280 of the image capturing optical lens assembly.

The detailed optical data of the second embodiment are shown in TABLE 3, and the aspheric surface data are shown in TABLE 4, wherein the units of the curvature radius, the thickness and the focal length are expressed in mm, and HFOV is half of the maximal field of view.

TABLE 3

(Embodiment 2)
f = 3.85 mm, Fno = 2.03, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.205 | | | | |
| 2 | Lens 1 | 1.865 | ASP | 0.300 | Plastic | 1.639 | 23.5 | −17.00 |
| 3 | | 1.492 | ASP | 0.125 | | | | |
| 4 | Lens 2 | 1.946 | ASP | 0.746 | Plastic | 1.544 | 55.9 | 2.58 |
| 5 | | −4.338 | ASP | 0.082 | | | | |
| 6 | Lens 3 | −43.214 | ASP | 0.257 | Plastic | 1.639 | 23.5 | −4.50 |
| 7 | | 3.089 | ASP | 0.286 | | | | |
| 8 | Lens 4 | 4.419 | ASP | 0.294 | Plastic | 1.639 | 23.5 | 43.61 |
| 9 | | 5.115 | ASP | 0.576 | | | | |
| 10 | Lens 5 | 23.394 | ASP | 0.631 | Plastic | 1.544 | 55.9 | 2.32 |
| 11 | | −1.323 | ASP | 0.050 | | | | |
| 12 | Lens 6 | 2.113 | ASP | 0.437 | Plastic | 1.535 | 55.7 | −2.42 |
| 13 | | 0.744 | ASP | 0.800 | | | | |
| 14 | IR-cut filter | Plano | | 0.210 | Glass | 1.517 | 64.2 | |
| 15 | | Plano | | 0.468 | | | | |
| 16 | Image Surface | Plano | | — | | | | |

Note:
Reference wavelength is d-line 587.6 nm

TABLE 4

Aspheric Coefficients

| | Surface # | | | | | |
|---|---|---|---|---|---|---|
| | 2 | 3 | 4 | 5 | 6 | 7 |
| k = | −9.5006E−01 | −1.4696E+00 | −5.1972E+00 | −9.0000E+01 | 1.8649E+01 | 2.8260E+00 |
| A4 = | −4.8463E−02 | −7.9417E−02 | 2.6637E−02 | −1.8368E−02 | 1.1132E−01 | −1.1792E−02 |
| A6 = | 1.7148E−02 | 3.7001E−02 | −3.8254E−02 | −1.7579E−01 | −4.3697E−01 | −1.2813E−01 |
| A8 = | −5.3900E−03 | −1.5693E−02 | 9.7414E−03 | 1.6829E−01 | 4.4501E−01 | 1.2110E−01 |
| A10 = | −3.0618E−03 | | −3.9222E−03 | −5.1187E−02 | −1.8095E−01 | −4.9657E−02 |
| A12 = | | | | | 2.5264E−02 | 6.5309E−03 |

| | Surface # | | | | | |
|---|---|---|---|---|---|---|
| | 8 | 9 | 10 | 11 | 12 | 13 |
| k = | −5.9209E+01 | −1.8336E+01 | −3.3470E+00 | −8.3516E+00 | −2.6657E−01 | −3.7283E+00 |
| A4 = | −8.4909E−02 | −1.5264E−01 | 9.4160E−02 | 4.6088E−02 | −2.4725E−01 | −1.2284E−01 |
| A6 = | 5.6241E−02 | 8.3547E−02 | −1.2263E−01 | −8.1544E−02 | 5.4175E−03 | 4.7993E−02 |
| A8 = | −9.6690E−02 | −6.4550E−02 | 9.9072E−02 | 7.2034E−02 | 5.1453E−02 | −1.2048E−02 |
| A10 = | 7.3382E−02 | 1.3063E−02 | −5.3443E−02 | −2.5383E−02 | −2.0237E−02 | 1.8540E−03 |
| A12 = | −1.7548E−02 | 1.6176E−02 | 1.5774E−02 | 3.5764E−03 | 3.0896E−03 | −1.6330E−04 |
| A14 = | | −5.6694E−03 | −2.0349E−03 | −1.5400E−04 | −1.7312E−04 | 6.2775E−06 |

In the 2nd embodiment, the equation of the aspheric surface profiles of the aforementioned lens elements is the same as the equation of the 1st embodiment. Also, the definitions of these parameters shown in Table 5 below are the same as those stated in the 1st embodiment with corresponding values for the 2nd embodiment, so an explanation in this regard will not be provided again.

Moreover, these parameters can be calculated from Table 3 and Table 4 and satisfy the conditions stated in Table 5.

TABLE 5

2$^{nd}$ Embodiment

| f [mm] | 3.85 | |R1/f| | 0.48 |
|---|---|---|---|
| Fno | 2.03 | f/R3 | 1.98 |
| HFOV [deg.] | 38.0 | R12/f | 0.19 |
| V5/(V3 + V4) | 1.19 | |f/f2| + |f/f3| | 2.35 |
| CT2/(T12 + T23) | 3.60 | |f/f5| + |f/f6| | 3.25 |
| CT5/CT6 | 1.44 | | |
| CT1/|Sag12| | 1.11 | | |

3rd Embodiment

Figure 3A:
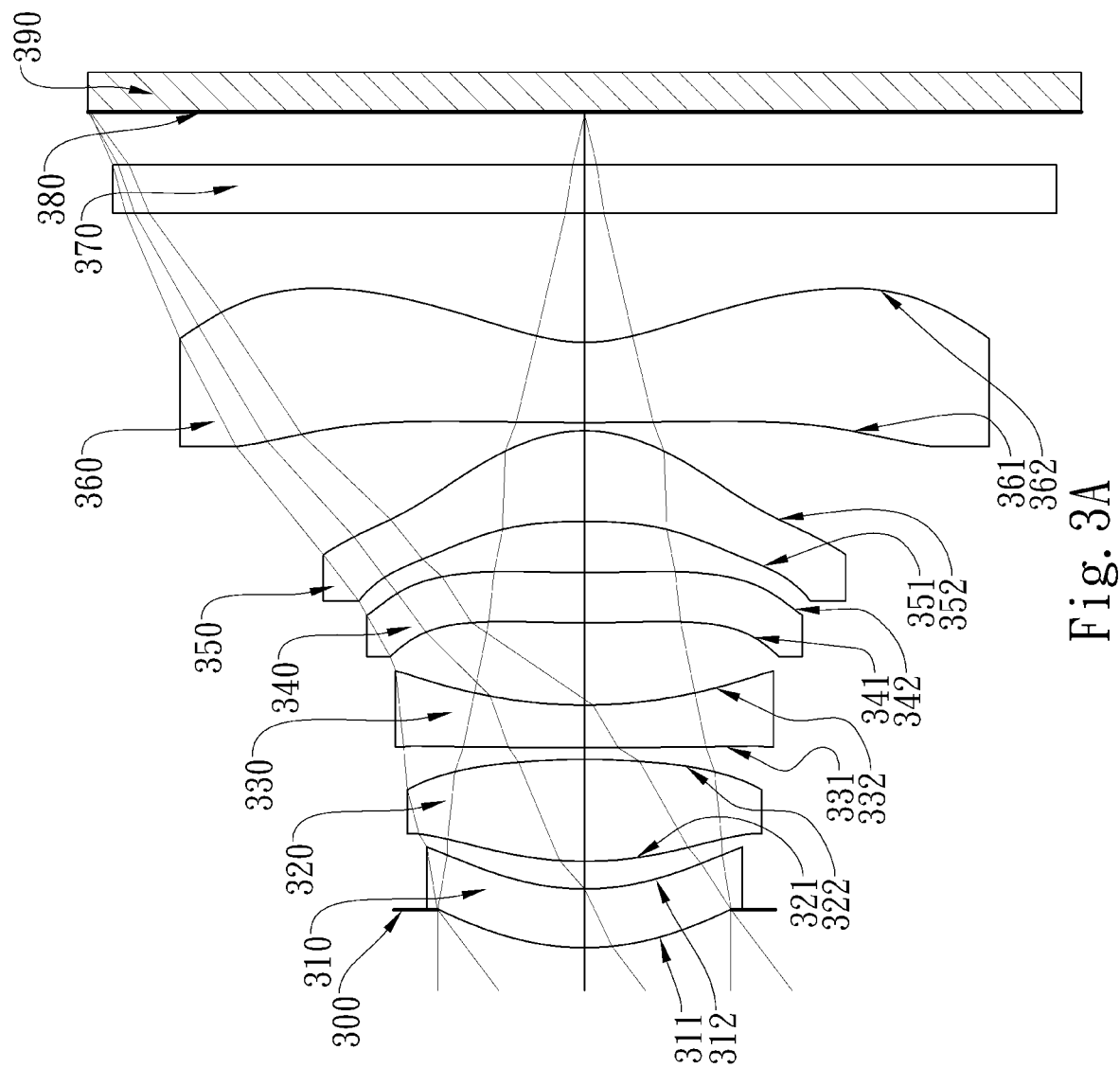
FIG. 3A is a schematic view of an image capturing device according to the 3rd embodiment of the present disclosure.
Figure 3B:
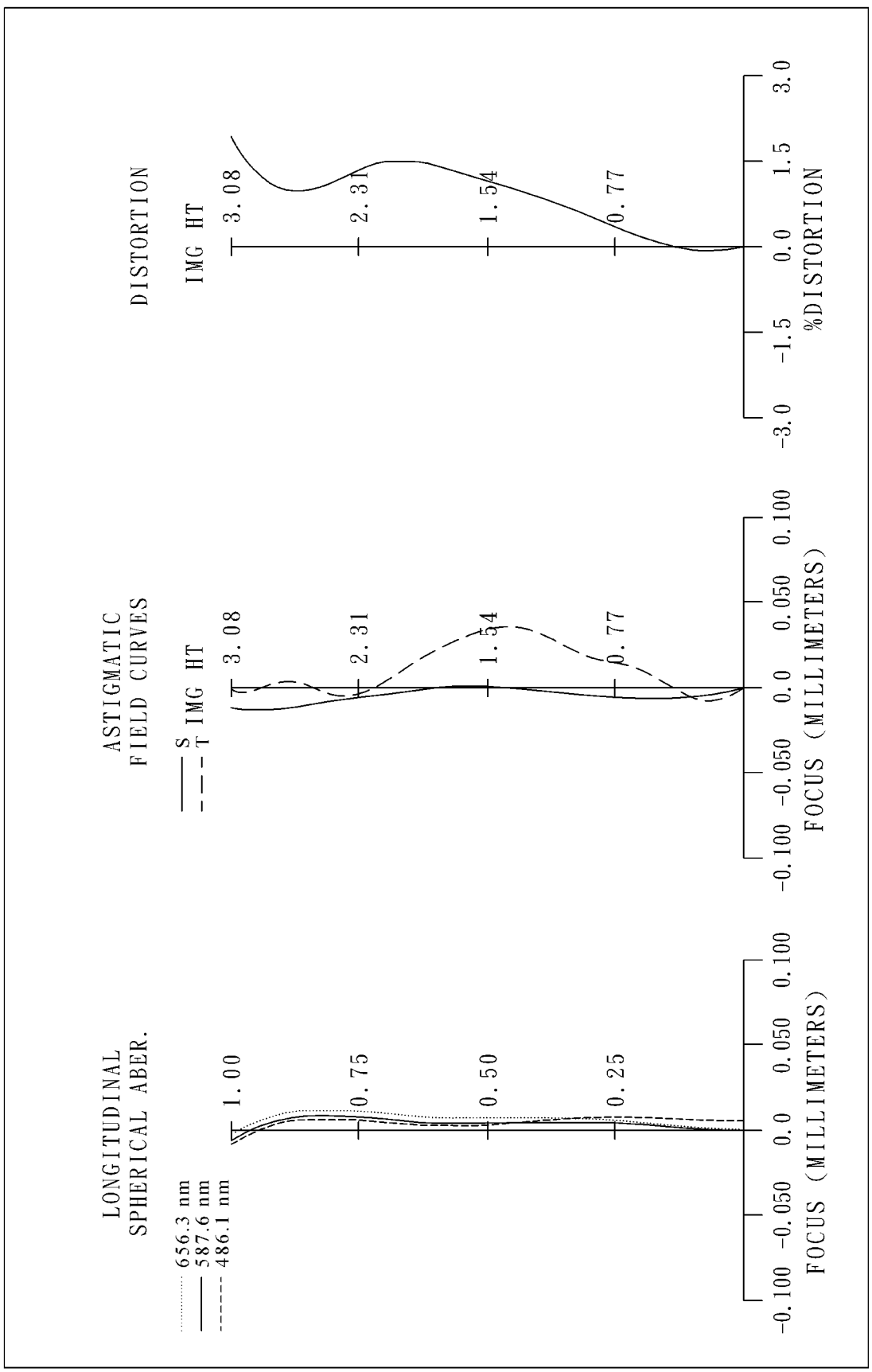
FIG. 3B shows longitudinal spherical aberration curves, astigmatic field curves and a distortion curve of the image capturing device according to the 3rd embodiment.

FIG. 3A is a schematic view of an image capturing device according to the 3rd embodiment of the present disclosure. FIG. 3B shows, in order from left to right, longitudinal spherical aberration curves, astigmatic field curves and a distortion curve of the image capturing device according to the 3rd embodiment.

In FIG. 3A, the image capturing device includes an image capturing optical lens assembly (not otherwise herein labeled) of the present disclosure and an image sensor 390. The image capturing optical lens assembly includes, in order from an object side to an image side, a first lens element 310, a second lens element 320, a third lens element 330, a fourth lens element 340, a fifth lens element 350, and a sixth lens element 360, wherein the image capturing optical lens assembly has a total of six lens elements (310-360) with refractive power.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with positive refractive power has an object-side surface 321 being convex in a paraxial region thereof and an image-side surface 322 being convex in a paraxial region thereof, which are both aspheric, and the second lens element 320 is made of glass.

The third lens element 330 with negative refractive power has an object-side surface 331 being concave in a paraxial region thereof and an image-side surface 332 being concave in a paraxial region thereof, which are both aspheric, and the third lens element 330 is made of plastic material. Furthermore, the object-side surface 331 of the third lens element 330 has at least one inflection point.

The fourth lens element 340 with negative refractive power has an object-side surface 341 being convex in a paraxial region thereof and an image-side surface 342 being concave in a paraxial region thereof, which are both aspheric, and the fourth lens element 340 is made of plastic material. Furthermore, the image-side surface 342 of the fourth lens element 340 has at least one convex shape in an off-axis region thereof.

The fifth lens element 350 with positive refractive power has an object-side surface 351 being concave in a paraxial region thereof and an image-side surface 352 being convex in a paraxial region thereof, which are both aspheric, and the fifth lens element 350 is made of plastic material.

The sixth lens element 360 with negative refractive power has an object-side surface 361 being convex in a paraxial region thereof and an image-side surface 362 being concave in a paraxial region thereof, which are both aspheric, and the sixth lens element 360 is made of plastic material. Furthermore, the image-side surface 362 of the sixth lens element 360 has at least one convex shape in an off-axis region thereof.

The image capturing optical lens assembly further includes an aperture stop 300 and an IR-cut filter 370. The aperture stop 300 is disposed between an imaged object and the first lens element 310. The IR-cut filter 370 is made of glass and located between the sixth lens element 360 and an image surface 380, and will not affect the focal length of the image capturing optical lens assembly.

The image sensor 390 is disposed on or near the image surface 380 of the image capturing optical lens assembly.

The detailed optical data of the third embodiment are shown in TABLE 6, and the aspheric surface data are shown in TABLE 7, wherein the units of the curvature radius, the thickness and the focal length are expressed in mm, and HFOV is half of the maximal field of view.

TABLE 6

(Embodiment 3)
f = 4.00 mm, Fno = 2.20, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.234 | | | | |
| 2 | Lens 1 | 1.641 | ASP | 0.364 | Plastic | 1.544 | 55.9 | 220.35 |
| 3 | | 1.533 | ASP | 0.171 | | | | |
| 4 | Lens 2 | 2.242 | ASP | 0.632 | Glass | 1.592 | 60.6 | 2.59 |
| 5 | | −4.344 | ASP | 0.072 | | | | |
| 6 | Lens 3 | −97.807 | ASP | 0.265 | Plastic | 1.650 | 21.5 | −4.59 |
| 7 | | 3.084 | ASP | 0.510 | | | | |
| 8 | Lens 4 | 8.562 | ASP | 0.310 | Plastic | 1.650 | 21.5 | −51.98 |
| 9 | | 6.735 | ASP | 0.319 | | | | |
| 10 | Lens 5 | −3.775 | ASP | 0.562 | Plastic | 1.544 | 55.9 | 1.95 |
| 11 | | −0.870 | ASP | 0.050 | | | | |
| 12 | Lens 6 | 20.329 | ASP | 0.498 | Plastic | 1.544 | 55.9 | −1.92 |
| 13 | | 0.987 | ASP | 0.800 | | | | |
| 14 | IR-cut filter | Plano | | 0.300 | Glass | 1.517 | 64.2 | |
| 15 | | Plano | | 0.330 | | | | |
| 16 | Image Surface | Plano | | — | | | | |

Note:
Reference wavelength is d-line 587.6 nm

TABLE 7

Aspheric Coefficients

| | Surface # | | | | | |
|---|---|---|---|---|---|---|
| | 2 | 3 | 4 | 5 | 6 | 7 |
| k = | −2.3625E−01 | −5.1323E−01 | −6.3496E+00 | −8.5546E+01 | 9.0000E+01 | 4.7426E+00 |
| A4 = | −2.9819E−02 | −4.2192E−02 | 4.4302E−02 | 9.0303E−04 | 1.4707E−01 | 4.7795E−03 |
| A6 = | −1.9524E−02 | −3.7052E−02 | −5.3859E−02 | −1.9805E−01 | −4.2318E−01 | −1.1289E−01 |
| A8 = | 1.1402E−02 | 3.0115E−03 | −2.6940E−02 | 1.9648E−01 | 4.9123E−01 | 1.1398E−01 |
| A10 = | −9.6681E−03 | | 2.0339E−02 | −7.0527E−02 | −2.2873E−01 | −3.9910E−02 |
| A12 = | | | | | 2.8300E−02 | −4.5156E−03 |

| | Surface # | | | | | |
|---|---|---|---|---|---|---|
| | 8 | 9 | 10 | 11 | 12 | 13 |
| k = | −9.0000E+01 | −1.8336E+01 | 4.1711E−01 | −3.1586E+00 | 3.1571E+00 | −6.1836E+00 |
| A4 = | −1.1006E−01 | −2.1050E−01 | −2.7733E−01 | −8.8569E−02 | −2.8139E−02 | −6.3400E−02 |
| A6 = | 3.7911E−02 | 2.1305E−01 | 1.4087E−01 | −1.1462E−01 | 1.9850E−02 | 2.4929E−02 |
| A8 = | −2.5110E−02 | −2.2483E−01 | 1.9670E−01 | 3.0457E−01 | −1.2431E−02 | −6.9183E−03 |
| A10 = | −3.2822E−02 | 1.6220E−01 | −2.2965E−01 | −2.0229E−01 | 3.6192E−03 | 1.0336E−03 |
| A12 = | 1.7673E−02 | −7.9151E−02 | 8.3773E−02 | 5.6359E−02 | −4.7701E−04 | −8.1559E−05 |
| A14 = | | 1.7180E−02 | −1.1045E−02 | −5.8255E−03 | 2.3696E−05 | 2.8318E−06 |

In the 3rd embodiment, the equation of the aspheric surface profiles of the aforementioned lens elements is the same as the equation of the 1st embodiment. Also, the definitions of these parameters shown in Table 8 below are the same as those stated in the 1st embodiment with corresponding values for the 3rd embodiment, so an explanation in this regard will not be provided again.

Moreover, these parameters can be calculated from Table 6 and Table 7 and satisfy the conditions stated in Table 8.

TABLE 8

3rd Embodiment

| f [mm] | 4.00 | |R1/f| | 0.41 |
|---|---|---|---|
| Fno | 2.20 | f/R3 | 1.78 |
| HFOV [deg.] | 37.0 | R12/f | 0.25 |

TABLE 8-continued

3rd Embodiment

| V5/(V3 + V4) | 1.30 | |f/f2| + |f/f3| | 2.42 |
|---|---|---|---|
| CT2/(T12 + T23) | 2.60 | |f/f5| + |f/f6| | 4.13 |
| CT5/CT6 | 1.13 | | |
| CT1/|Sag12| | 1.40 | | |

4th Embodiment

Figure 4A:
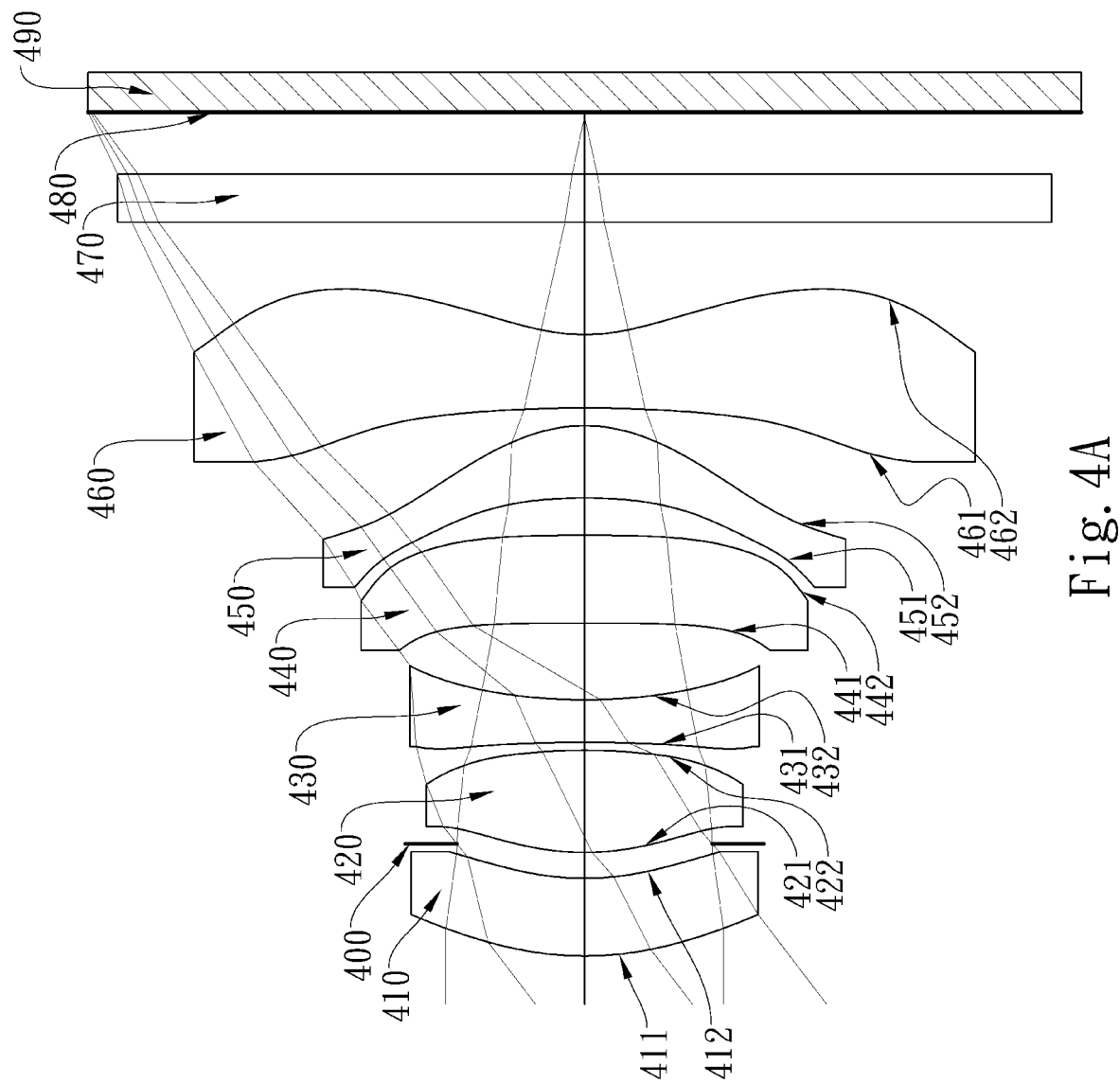
FIG. 4A is a schematic view of an image capturing device according to the 4th embodiment of the present disclosure.
Figure 4B:
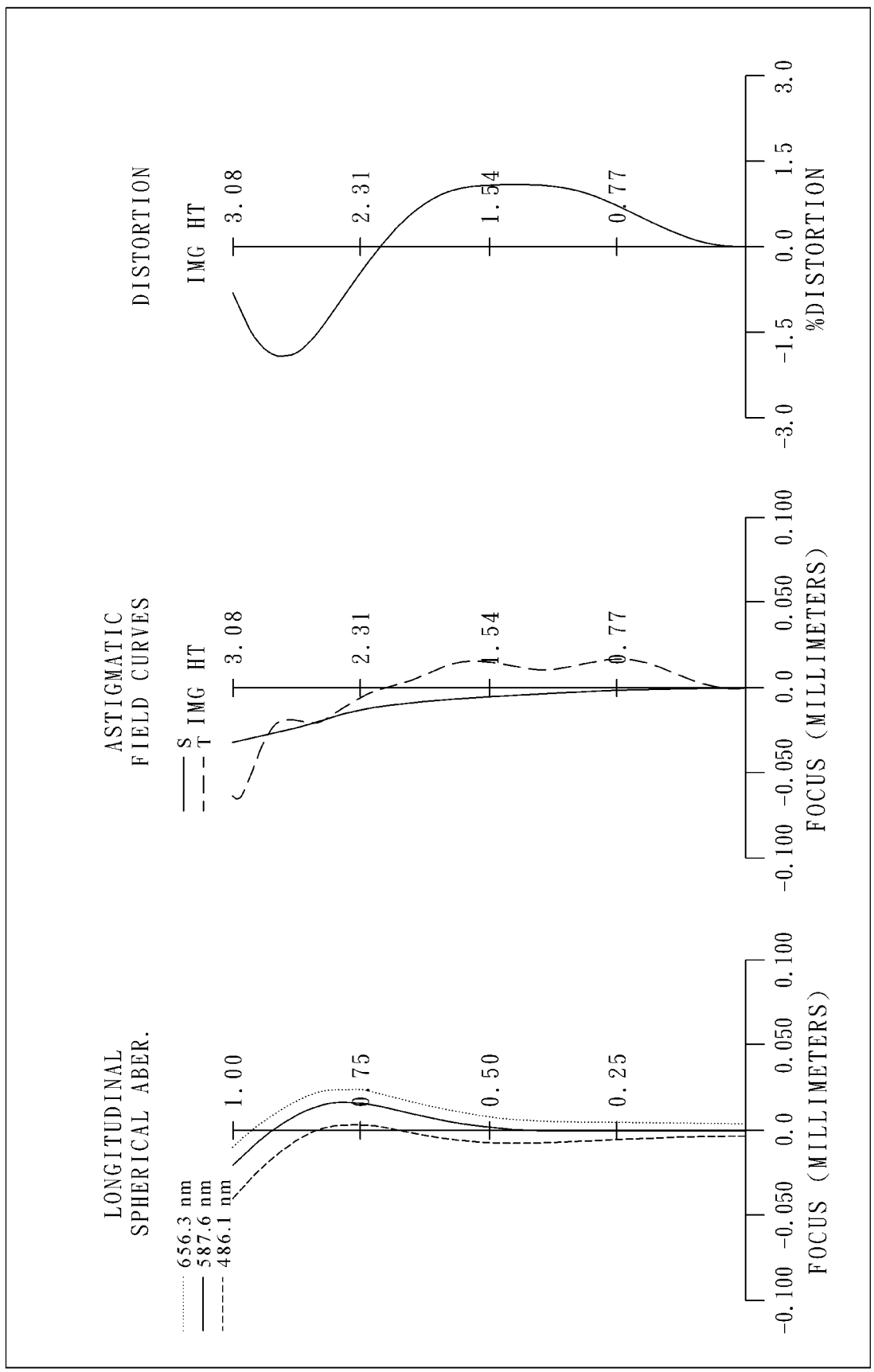
FIG. 4B shows longitudinal spherical aberration curves, astigmatic field curves and a distortion curve of the image capturing device according to the 4th embodiment.

FIG. 4A is a schematic view of an image capturing device according to the 4th embodiment of the present disclosure. FIG. 4B shows, in order from left to right, longitudinal spherical aberration curves, astigmatic field curves and a distortion curve of the image capturing device according to the 4th embodiment.

In FIG. 4A, the image capturing device includes an image capturing optical lens assembly (not otherwise herein labeled) of the present disclosure and an image sensor 490. The image capturing optical lens assembly includes, in order from an object side to an image side, a first lens element 410, a second lens element 420, a third lens element 430, a fourth lens element 440, a fifth lens element 450, and a sixth lens element 460, wherein the image capturing optical lens assembly has a total of six lens elements (410-460) with refractive power.

The first lens element 410 with negative refractive power has an object-side surface 411 being convex in a paraxial region thereof and an image-side surface 412 being concave in a paraxial region thereof, which are both aspheric, and the first lens element 410 is made of plastic material.

The second lens element 420 with positive refractive power has an object-side surface 421 being convex in a paraxial region thereof and an image-side surface 422 being convex in a paraxial region thereof, which are both aspheric, and the second lens element 420 is made of plastic material.

The third lens element 430 with negative refractive power has an object-side surface 431 being concave in a paraxial region thereof and an image-side surface 432 being concave in a paraxial region thereof, which are both aspheric, and the third lens element 430 is made of plastic material. Furthermore, the object-side surface 431 of the third lens element 430 has at least one inflection point.

The fourth lens element 440 with positive refractive power has an object-side surface 441 being concave in a paraxial region thereof and an image-side surface 442 being convex in a paraxial region thereof, which are both aspheric, and the fourth lens element 440 is made of plastic material.

The fifth lens element 450 with positive refractive power has an object-side surface 451 being concave in a paraxial region thereof and an image-side surface 452 being convex in a paraxial region thereof, which are both aspheric, and the fifth lens element 450 is made of plastic material.

The sixth lens element 460 with negative refractive power has an object-side surface 461 being concave in a paraxial region thereof and an image-side surface 462 being concave in a paraxial region thereof, which are both aspheric, and the sixth lens element 460 is made of plastic material. Furthermore, the image-side surface 462 of the sixth lens element 460 has at least one convex shape in an off-axis region thereof.

The image capturing optical lens assembly further includes an aperture stop 400 and an IR-cut filter 470. The aperture stop 400 is disposed between the first lens element 410 and the second lens element 420. The IR-cut filter 470 is made of glass and located between the sixth lens element 460 and an image surface 480, and will not affect the focal length of the image capturing optical lens assembly.

The image sensor 490 is disposed on or near the image surface 480 of the image capturing optical lens assembly.

The detailed optical data of the fourth embodiment are shown in TABLE 9, and the aspheric surface data are shown in TABLE 10, wherein the units of the curvature radius, the thickness and the focal length are expressed in mm, and HFOV is half of the maximal field of view.

TABLE 9

(Embodiment 4)
f = 4.05 mm, Fno = 2.35, HFOV = 37.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.983 | ASP | 0.483 | Plastic | 1.639 | 23.5 | −28.07 |
| 2 | | 1.616 | ASP | 0.216 | | | | |
| 3 | Ape. Stop | Plano | | −0.054 | | | | |
| 4 | Lens 2 | 1.603 | ASP | 0.635 | Plastic | 1.544 | 55.9 | 2.16 |
| 5 | | −3.774 | ASP | 0.050 | | | | |
| 6 | Lens 3 | −8.904 | ASP | 0.265 | Plastic | 1.639 | 23.5 | −3.79 |
| 7 | | 3.364 | ASP | 0.476 | | | | |
| 8 | Lens 4 | −76.136 | ASP | 0.549 | Plastic | 1.639 | 23.5 | 19.86 |
| 9 | | −10.908 | ASP | 0.232 | | | | |
| 10 | Lens 5 | −3.216 | ASP | 0.450 | Plastic | 1.560 | 48.0 | 2.21 |
| 11 | | −0.939 | ASP | 0.110 | | | | |
| 12 | Lens 6 | −10.240 | ASP | 0.457 | Plastic | 1.535 | 55.7 | −1.87 |
| 13 | | 1.128 | ASP | 0.700 | | | | |
| 14 | IR-cut filter | Plano | | 0.300 | Glass | 1.517 | 64.2 | |
| 15 | | Plano | | 0.385 | | | | |
| 16 | Image Surface | Plano | | — | | | | |

Note:
Reference wavelength is d-line 587.6 nm

TABLE 10

Aspheric Coefficients

| | Surface # | | | | | |
|---|---|---|---|---|---|---|
| | 1 | 2 | 4 | 5 | 6 | 7 |
| k = | −5.7523E−01 | −2.1481E+00 | −5.1057E+00 | −2.0516E+00 | −7.1165E+01 | 3.7642E+00 |
| A4 = | −3.7779E−02 | −8.5995E−02 | 3.7763E−02 | 6.4233E−02 | 6.5837E−02 | −9.9342E−03 |
| A6 = | 9.2238E−03 | 2.3775E−02 | −7.6710E−02 | −3.5241E−01 | −3.2167E−01 | −9.6870E−03 |
| A8 = | −1.2136E−02 | −3.6991E−02 | −8.6875E−02 | 2.6822E−01 | 4.1527E−01 | −1.8667E−02 |
| A10 = | 1.0602E−02 | 3.6436E−02 | 3.9520E−02 | −7.1191E−02 | −1.5582E−01 | 2.2647E−01 |
| A12 = | −3.5836E−03 | 4.6081E−07 | −1.7005E−07 | −3.7222E−05 | 9.5053E−03 | −3.7548E−01 |
| A14 | −1.6420E−06 | 9.3737E−10 | −2.4239E−08 | 2.6821E−08 | 3.5253E−05 | 2.4673E−01 |
| A16 | −5.0985E−07 | 3.2671E−10 | −3.5042E−09 | 5.0416E−09 | 6.9823E−09 | −5.7653E−02 |

| | Surface # | | | | | |
|---|---|---|---|---|---|---|
| | 8 | 9 | 10 | 11 | 12 | 13 |
| k = | 8.9919E+01 | −2.0465E+01 | 2.9303E+00 | −2.7882E+00 | 1.0183E+01 | −5.4912E+00 |
| A4 = | 1.5752E−02 | 5.1742E−02 | −1.5154E−01 | −1.0657E−01 | −3.9771E−02 | −1.0047E−01 |
| A6 = | −3.5756E−01 | −3.6773E−01 | 1.1369E−01 | 6.2159E−02 | 7.8334E−02 | 6.2075E−02 |
| A8 = | 9.4123E−01 | 5.9434E−01 | −1.4877E−01 | 3.7236E−02 | −7.7804E−02 | −2.8959E−02 |
| A10 = | −1.5526E+00 | −6.0723E−01 | 2.3795E−01 | −4.4330E−02 | 3.5295E−02 | 8.2981E−03 |
| A12 = | 1.4931E+00 | 4.0608E−01 | −1.5071E−01 | 1.8291E−02 | −8.0761E−03 | −1.4363E−03 |
| A14 = | −7.7570E−01 | −1.5902E−01 | 3.3077E−02 | −3.7920E−03 | 9.2581E−04 | 1.3625E−04 |
| A16 = | 1.6501E−01 | 2.6042E−02 | −9.6229E−04 | 3.2310E−04 | −4.2687E−05 | −5.3431E−06 |

In the 4th embodiment, the equation of the aspheric surface profiles of the aforementioned lens elements is the same as the equation of the 1st embodiment. Also, the definitions of these parameters shown in Table 11 below are the same as those stated in the 1st embodiment with corresponding values for the 4th embodiment, so an explanation in this regard will not be provided again.

Moreover, these parameters can be calculated from Table 9 and Table 10 and satisfy the conditions stated in Table 11.

TABLE 11

| 4$^{th}$ Embodiment | | | |
|---|---|---|---|
| f [mm] | 4.05 | |R1/f| | 0.49 |
| Fno | 2.35 | f/R3 | 2.53 |
| HFOV [deg.] | 37.4 | R12/f | 0.28 |
| V5/(V3 + V4) | 1.02 | |f/f2| + |f/f3| | 2.94 |
| CT2/(T12 + T23) | 3.00 | |f/f5| + |f/f6| | 4.00 |
| CT5/CT6 | 0.98 | | |
| CT1/|Sag12| | 2.91 | | |

5th Embodiment

Figure 5A:
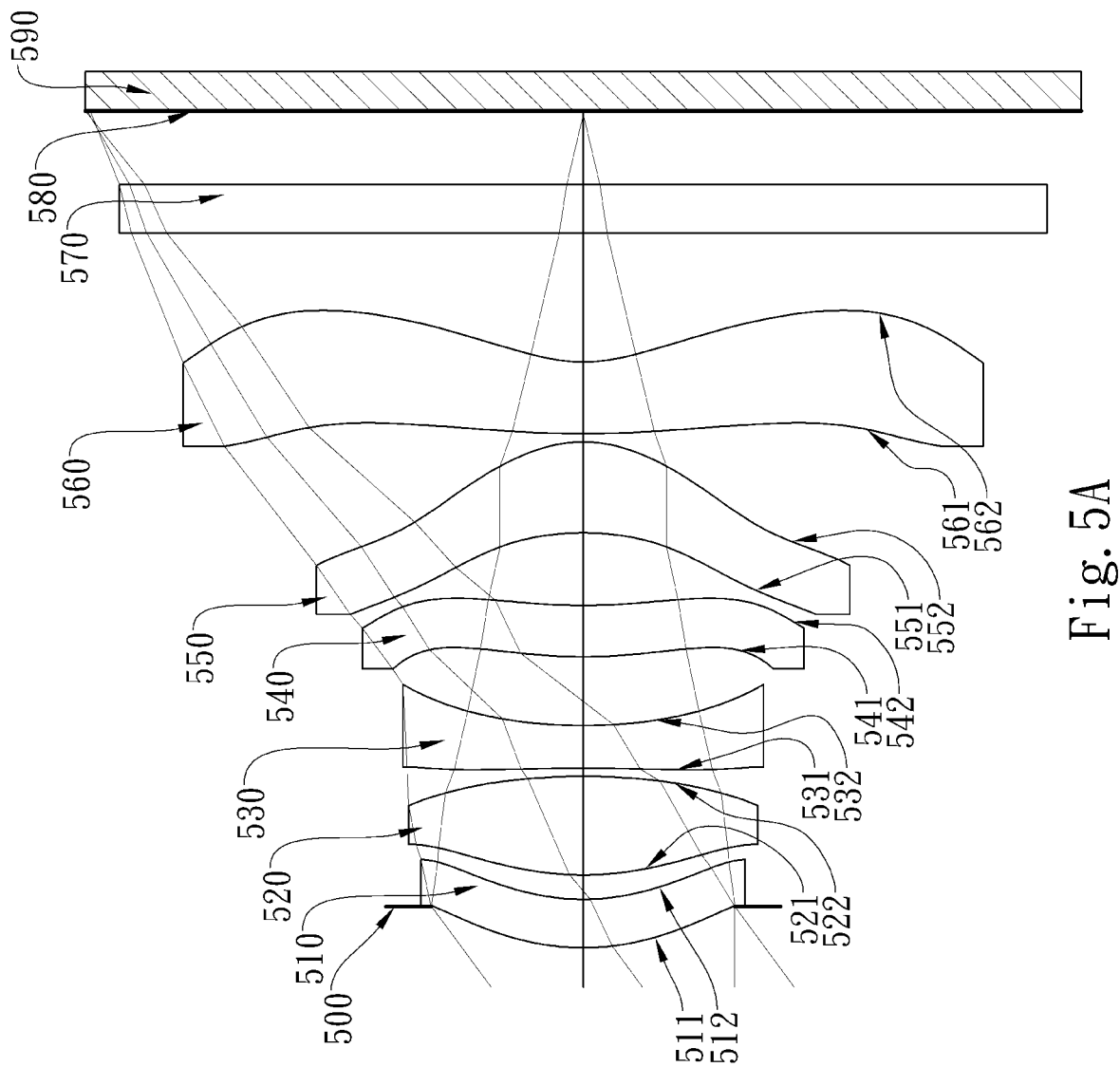
FIG. 5A is a schematic view of an image capturing device according to the 5th embodiment of the present disclosure.
Figure 5B:
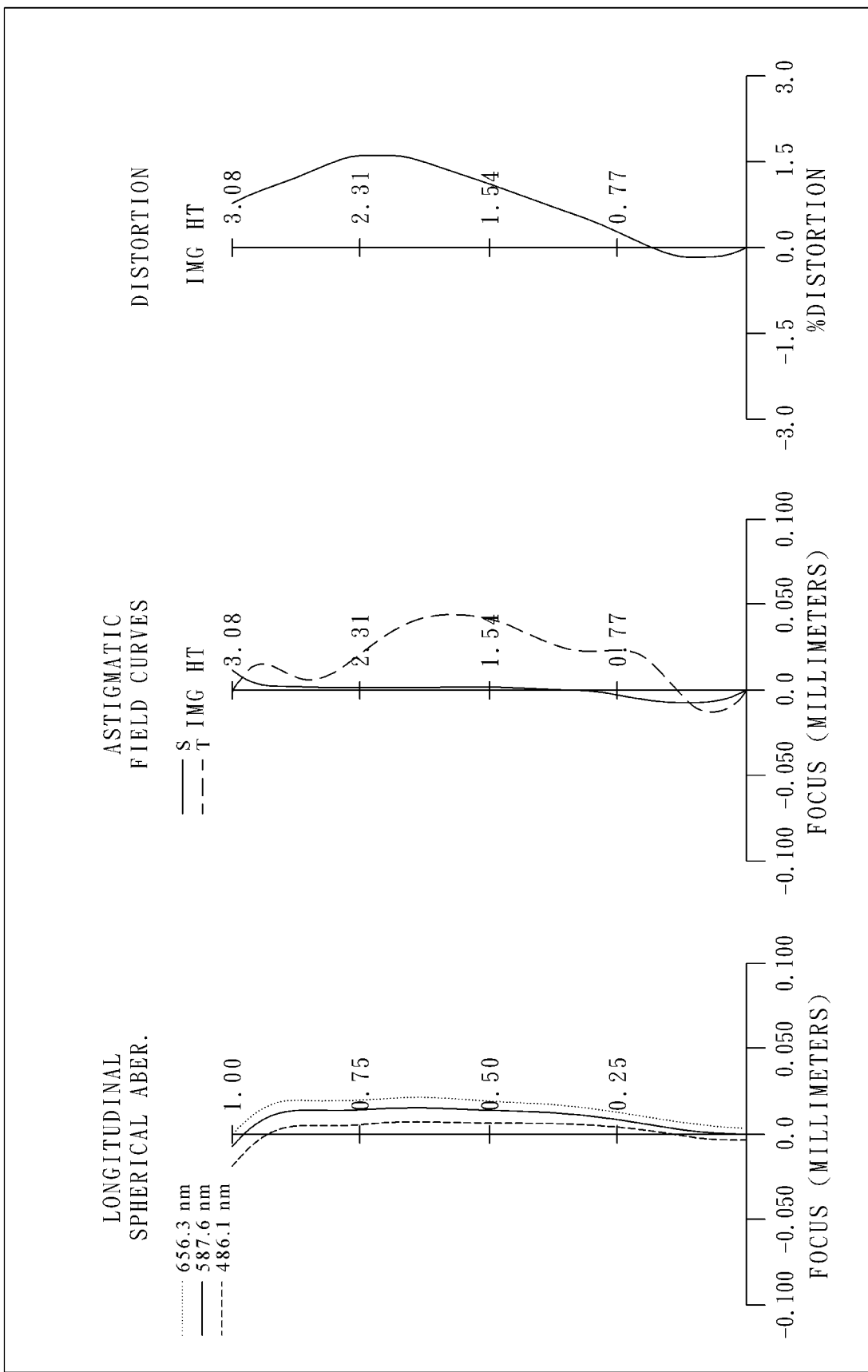
FIG. 5B shows longitudinal spherical aberration curves, astigmatic field curves and a distortion curve of the image capturing device according to the 5th embodiment.

FIG. 5A is a schematic view of an image capturing device according to the 5th embodiment of the present disclosure. FIG. 5B shows, in order from left to right, longitudinal spherical aberration curves, astigmatic field curves and a distortion curve of the image capturing device according to the 5th embodiment.

In FIG. 5A, the image capturing device includes an image capturing optical lens assembly (not otherwise herein labeled) of the present disclosure and an image sensor 590. The image capturing optical lens assembly includes, in order from an object side to an image side, a first lens element 510, a second lens element 520, a third lens element 530, a fourth lens element 540, a fifth lens element 550, and a sixth lens element 560, wherein the image capturing optical lens assembly has a total of six lens elements (510-560) with refractive power.

The first lens element 510 with negative refractive power has an object-side surface 511 being convex in a paraxial region thereof and an image-side surface 512 being concave in a paraxial region thereof, which are both aspheric, and the first lens element 510 is made of plastic material.

The second lens element 520 with positive refractive power has an object-side surface 521 being convex in a paraxial region thereof and an image-side surface 522 being convex in a paraxial region thereof, which are both aspheric, and the second lens element 520 is made of plastic material.

The third lens element 530 with negative refractive power has an object-side surface 531 being concave in a paraxial region thereof and an image-side surface 532 being concave in a paraxial region thereof, which are both aspheric, and the third lens element 530 is made of plastic material. Furthermore, the object-side surface 531 of the third lens element 530 has at least one inflection point.

The fourth lens element 540 with positive refractive power has an object-side surface 541 being convex in a paraxial region thereof and an image-side surface 542 being concave in a paraxial region thereof, which are both aspheric, and the fourth lens element 540 is made of plastic material. Furthermore, the image-side surface 542 of the fourth lens element 540 has at least one convex shape in an off-axis region thereof.

The fifth lens element 550 with positive refractive power has an object-side surface 551 being concave in a paraxial region thereof and an image-side surface 552 being convex in a paraxial region thereof, which are both aspheric, and the fifth lens element 550 is made of plastic material.

The sixth lens element 560 with negative refractive power has an object-side surface 561 being convex in a paraxial region thereof and an image-side surface 562 being concave in a paraxial region thereof, which are both aspheric, and the sixth lens element 560 is made of plastic material. Furthermore, the image-side surface 562 of the sixth lens element 560 has at least one convex shape in an off-axis region thereof.

The image capturing optical lens assembly further includes an aperture stop 500 and an IR-cut filter 570. The aperture stop 500 is disposed between an imaged object and the first lens element 510. The IR-cut filter 570 is made of glass and located between the sixth lens element 560 and an image surface 580, and will not affect the focal length of the image capturing optical lens assembly.

The image sensor 590 is disposed on or near the image surface 580 of the image capturing optical lens assembly.

The detailed optical data of the fifth embodiment are shown in TABLE 12, and the aspheric surface data are shown in TABLE 13, wherein the units of the curvature radius, the thickness and the focal length are expressed in mm, and HFOV is half of the maximal field of view.

TABLE 12

(Embodiment 5)
f = 4.13 mm, Fno = 2.20, HFOV = 36.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.255 | | | | |
| 2 | Lens 1 | 1.500 | ASP | 0.300 | Plastic | 1.544 | 55.9 | −166.89 |
| 3 | | 1.371 | ASP | 0.151 | | | | |
| 4 | Lens 2 | 1.865 | ASP | 0.612 | Plastic | 1.544 | 55.9 | 2.35 |
| 5 | | −3.576 | ASP | 0.050 | | | | |
| 6 | Lens 3 | −8.368 | ASP | 0.265 | Plastic | 1.639 | 23.5 | −3.62 |
| 7 | | 3.231 | ASP | 0.426 | | | | |
| 8 | Lens 4 | 2.892 | ASP | 0.319 | Plastic | 1.639 | 23.5 | 27.68 |
| 9 | | 3.308 | ASP | 0.450 | | | | |
| 10 | Lens 5 | −1.768 | ASP | 0.565 | Plastic | 1.544 | 55.9 | 2.15 |
| 11 | | −0.784 | ASP | 0.050 | | | | |
| 12 | Lens 6 | 5.648 | ASP | 0.445 | Plastic | 1.544 | 55.9 | −2.15 |
| 13 | | 0.942 | ASP | 0.800 | | | | |
| 14 | IR-cut filter | Plano | | 0.300 | Glass | 1.517 | 64.2 | |
| 15 | | Plano | | 0.457 | | | | |
| 16 | Image Surface | Plano | | — | | | | |

Note:
Reference wavelength is d-line 587.6 nm

TABLE 13

Aspheric Coefficients

| Surface # | 2 | 3 | 4 | 5 | 6 | 7 |
|---|---|---|---|---|---|---|
| k = | −5.5896E−01 | −1.4494E+00 | −6.3163E+00 | −5.6354E+01 | −4.3569E+01 | 5.3797E+00 |
| A4 = | −4.7192E−02 | −7.0688E−02 | 3.9453E−02 | −2.0570E−02 | 1.8352E−01 | 3.3300E−02 |
| A6 = | 1.3599E−02 | 6.7547E−02 | −4.7790E−02 | −1.9058E−01 | −4.1269E−01 | −7.7319E−02 |
| A8 = | −1.8138E−02 | −9.4969E−02 | −1.5747E−02 | 2.3811E−01 | 5.0227E−01 | 8.0864E−02 |
| A10 = | −1.7872E−02 | | 2.6867E−03 | −9.1459E−02 | −2.4357E−01 | −3.4197E−02 |
| A12 = | | | | | 2.7318E−02 | 3.8233E−04 |

| Surface # | 8 | 9 | 10 | 11 | 12 | 13 |
|---|---|---|---|---|---|---|
| k = | −9.0249E+00 | −1.8336E+01 | −3.9819E+00 | −3.0957E+00 | 1.9367E+00 | −6.9866E+00 |
| A4 = | −9.8090E−02 | −1.0549E−01 | −2.6887E−01 | −1.1386E−01 | −5.3755E−02 | −6.2835E−02 |
| A6 = | 3.2554E−02 | 5.8699E−02 | 1.3592E−01 | −9.7432E−02 | 2.7217E−02 | 2.6537E−02 |
| A8 = | −3.1922E−02 | −5.4107E−02 | 1.9802E−01 | 3.0547E−01 | −1.1348E−02 | −8.0041E−03 |
| A10 = | −3.2857E−02 | 4.0901E−03 | −2.2670E−01 | −2.0319E−01 | 2.1500E−03 | 1.3291E−03 |
| A12 = | 1.7673E−02 | 7.7777E−03 | 8.5227E−02 | 5.6128E−02 | −1.5555E−04 | −1.2193E−04 |
| A14 = | | −1.3520E−03 | −1.1376E−02 | −5.7523E−03 | 2.0108E−06 | 5.0552E−06 |

In the 5th embodiment, the equation of the aspheric surface profiles of the aforementioned lens elements is the same as the equation of the 1st embodiment. Also, the definitions of these parameters shown in Table 14 below are the same as those stated in the 1st embodiment with corresponding values for the 5th embodiment, so an explanation in this regard will not be provided again.

Moreover, these parameters can be calculated from Table 12 and Table 13 and satisfy the conditions stated in Table 14.

TABLE 14

| Embodiment 5 | | | |
|---|---|---|---|
| f [mm] | 4.13 | |R1/f| | 0.36 |
| Fno | 2.20 | f/R3 | 2.21 |

TABLE 14-continued

| Embodiment 5 | | | |
|---|---|---|---|
| HFOV [deg.] | 36.4 | R12/f | 0.23 |
| V5/(V3 + V4) | 1.19 | |f/f2| + |f/f3| | 2.90 |
| CT2/(T12 + T23) | 3.04 | |f/f5| + |f/f6| | 3.84 |

TABLE 14-continued

| Embodiment 5 | |
| --- | --- |
| CT5/CT6 | 1.27 |
| CT1/|Sag12| | 1.21 |

6th Embodiment

Figure 6A:
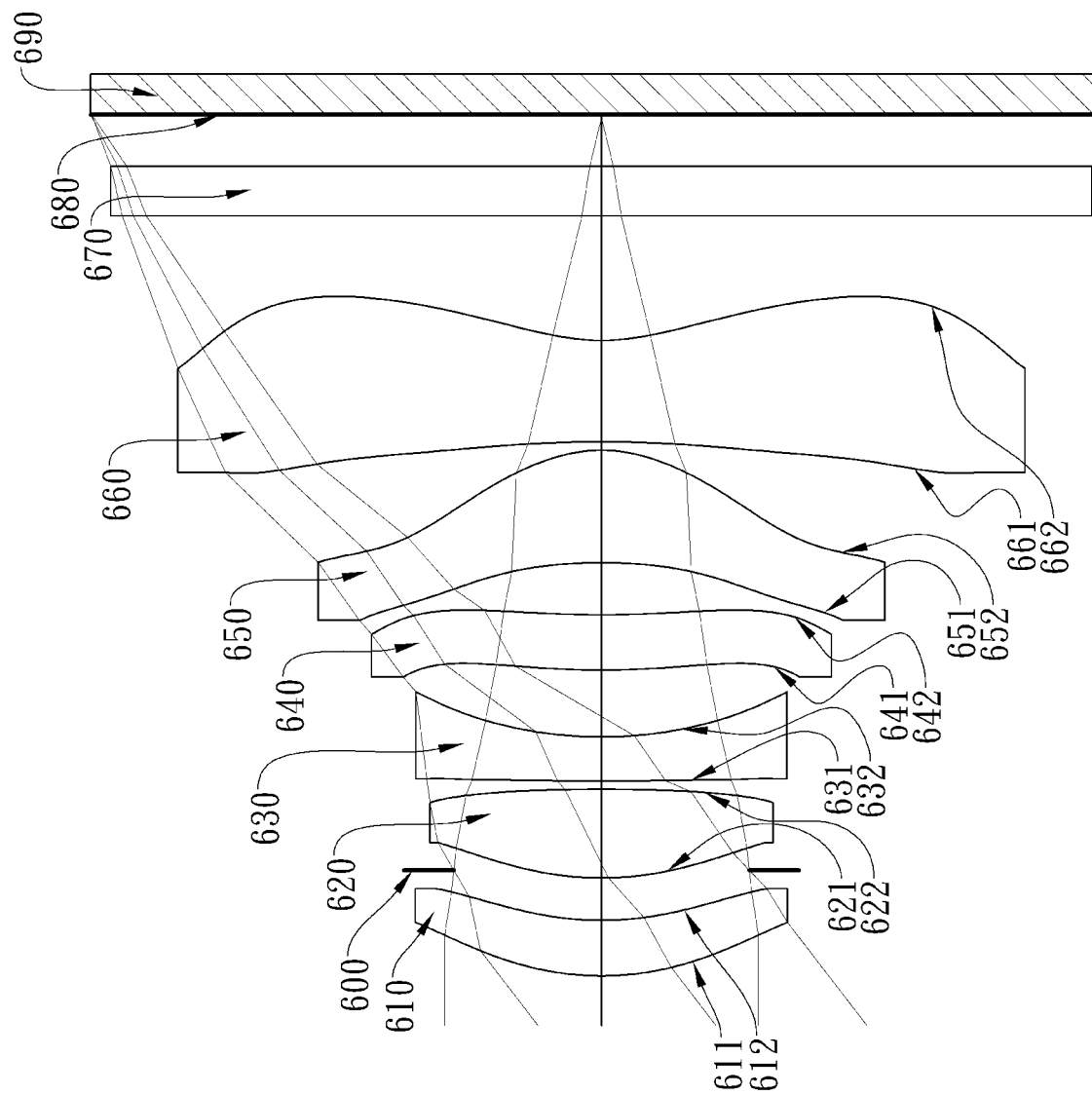
FIG. 6A is a schematic view of an image capturing device according to the 6th embodiment of the present disclosure.
Figure 6B:
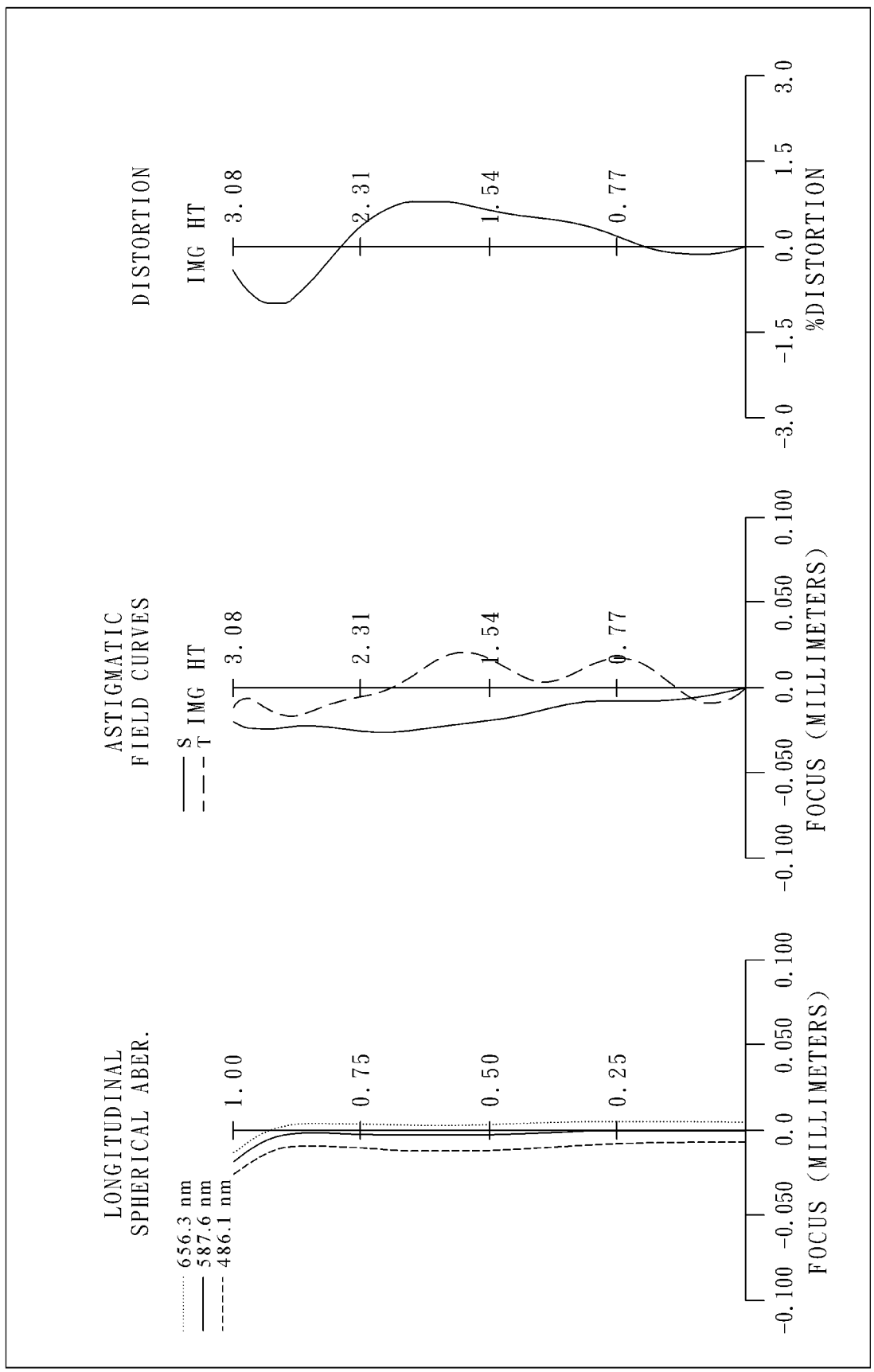
FIG. 6B shows longitudinal spherical aberration curves, astigmatic field curves and a distortion curve of the image capturing device according to the 6th embodiment.

FIG. 6A is a schematic view of an image capturing device according to the 6th embodiment of the present disclosure. FIG. 6B shows, in order from left to right, longitudinal spherical aberration curves, astigmatic field curves and a distortion curve of the image capturing device according to the 6th embodiment.

In FIG. 6A, the image capturing device includes an image capturing optical lens assembly (not otherwise herein labeled) of the present disclosure and an image sensor 690. The image capturing optical lens assembly includes, in order from an object side to an image side, a first lens element 610, a second lens element 620, a third lens element 630, a fourth lens element 640, a fifth lens element 650, and a sixth lens element 660, wherein the image capturing optical lens assembly has a total of six lens elements (610-660) with refractive power.

The first lens element 610 with positive refractive power has an object-side surface 611 being convex in a paraxial region thereof and an image-side surface 612 being concave in a paraxial region thereof, which are both aspheric, and the first lens element 610 is made of plastic material.

The second lens element 620 with positive refractive power has an object-side surface 621 being convex in a paraxial region thereof and an image-side surface 622 being convex in a paraxial region thereof, which are both aspheric, and the second lens element 620 is made of plastic material.

The third lens element 630 with negative refractive power has an object-side surface 631 being convex in a paraxial region thereof and an image-side surface 632 being concave in a paraxial region thereof, which are both aspheric, and the third lens element 630 is made of plastic material. Furthermore, the object-side surface 631 of the third lens element 630 has at least one inflection point.

The fourth lens element 640 with positive refractive power has an object-side surface 641 being convex in a paraxial region thereof and an image-side surface 642 being concave in a paraxial region thereof, which are both aspheric, and the fourth lens element 640 is made of plastic material. Furthermore, the image-side surface 642 of the fourth lens element 640 has at least one convex shape in an off-axis region thereof.

The fifth lens element 650 with positive refractive power has an object-side surface 651 being concave in a paraxial region thereof and an image-side surface 652 being convex in a paraxial region thereof, which are both aspheric, and the fifth lens element 650 is made of plastic material.

The sixth lens element 660 with negative refractive power has an object-side surface 661 being concave in a paraxial region thereof and an image-side surface 662 being concave in a paraxial region thereof, which are both aspheric, and the sixth lens element 660 is made of plastic material. Furthermore, the image-side surface 662 of the sixth lens element 660 has at least one convex shape in an off-axis region thereof.

The image capturing optical lens assembly further includes an aperture stop 600 and an IR-cut filter 670. The aperture stop 600 is disposed between the first lens element 610 and the second lens element 620. The IR-cut filter 670 is made of glass and located between the sixth lens element 660 and an image surface 680, and will not affect the focal length of the image capturing optical lens assembly.

The image sensor 690 is disposed on or near the image surface 680 of the image capturing optical lens assembly.

The detailed optical data of the sixth embodiment are shown in TABLE 15, and the aspheric surface data are shown in TABLE 16, wherein the units of the curvature radius, the thickness and the focal length are expressed in mm, and HFOV is half of the maximal field of view.

TABLE 15

(Embodiment 6)
f = 4.03 mm, Fno = 2.15, HFOV = 37.5 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Lens 1 | 1.700 | ASP | 0.335 | Plastic | 1.544 | 55.9 | 20.58 |
| 2 | | 1.865 | ASP | 0.303 | | | | |
| 3 | Ape. Stop | Plano | | −0.047 | | | | |
| 4 | Lens 2 | 1.901 | ASP | 0.534 | Plastic | 1.544 | 55.9 | 2.90 |
| 5 | | −8.295 | ASP | 0.050 | | | | |
| 6 | Lens 3 | 102.239 | ASP | 0.265 | Plastic | 1.639 | 23.5 | −4.00 |
| 7 | | 2.492 | ASP | 0.403 | | | | |
| 8 | Lens 4 | 4.782 | ASP | 0.333 | Plastic | 1.639 | 23.5 | 33.21 |
| 9 | | 6.004 | ASP | 0.314 | | | | |
| 10 | Lens 5 | −3.233 | ASP | 0.678 | Plastic | 1.544 | 55.9 | 1.98 |
| 11 | | −0.866 | ASP | 0.050 | | | | |
| 12 | Lens 6 | −8.125 | ASP | 0.611 | Plastic | 1.544 | 55.9 | −1.88 |
| 13 | | 1.199 | ASP | 0.750 | | | | |
| 14 | IR-cut filter | Plano | | 0.300 | Glass | 1.517 | 64.2 | |
| 15 | | Plano | | 0.311 | | | | |
| 16 | Image Surface | Plano | | — | | | | |

Note:
Reference wavelength is d-line 587.6 nm

TABLE 16

Aspheric Coefficients

| | Surface # | | | | | |
|---|---|---|---|---|---|---|
| | 1 | 2 | 4 | 5 | 6 | 7 |
| k = | −3.2057E−01 | −5.8285E−01 | −4.5187E+00 | −9.0000E+01 | −9.0000E+01 | 2.9881E+00 |
| A4 = | −2.6126E−02 | −5.5272E−02 | 4.9583E−02 | 9.0479E−02 | 9.2170E−02 | −2.3305E−02 |
| A6 = | −6.0019E−03 | −3.1834E−02 | −4.9241E−02 | −3.0985E−01 | −3.0386E−01 | −4.1487E−02 |
| A8 = | −1.2882E−02 | 3.1790E−03 | −1.8385E−02 | 3.3010E−01 | 3.9526E−01 | 6.9733E−02 |
| A10 = | 6.7825E−03 | | 1.6460E−02 | −1.3335E−01 | −1.7932E−01 | −4.0368E−02 |
| A12 = | −3.9320E−03 | | | | 5.2719E−03 | −1.1145E−03 |

| | Surface # | | | | | |
|---|---|---|---|---|---|---|
| | 8 | 9 | 10 | 11 | 12 | 13 |
| k = | 1.1940E+01 | −2.0465E+01 | −1.6368E+00 | −2.5106E+00 | 9.2904E+00 | −8.8205E+00 |
| A4 = | −7.1430E−02 | −5.6625E−02 | −1.0770E−01 | 2.4797E−02 | −1.4956E−02 | −5.4797E−02 |
| A6 = | −8.5848E−03 | 3.2675E−02 | −1.3003E−02 | −1.9988E−01 | 3.9582E−02 | 2.2760E−02 |
| A8 = | −1.5609E−02 | −5.6250E−02 | 1.7688E−01 | 2.7655E−01 | −2.2307E−02 | −7.0516E−03 |
| A10 = | −3.1221E−03 | 3.9067E−02 | −1.3908E−01 | −1.4230E−01 | 5.6135E−03 | 1.2827E−03 |
| A12 = | 4.7077E−04 | −1.7340E−02 | 4.3536E−02 | 3.2856E−02 | −6.5853E−04 | −1.4239E−04 |
| A14 = | | 3.5450E−03 | −5.1505E−03 | −2.8977E−03 | 3.0064E−05 | 7.2813E−06 |

In the 6th embodiment, the equation of the aspheric surface profiles of the aforementioned lens elements is the same as the equation of the 1st embodiment. Also, the definitions of these parameters shown in Table 17 below are the same as those stated in the 1st embodiment with corresponding values for the 6th embodiment, so an explanation in this regard will not be provided again.

Moreover, these parameters can be calculated from Table 15 and Table 16 and satisfy the conditions stated in Table 17.

TABLE 17

| $6^{th}$ Embodiment | | | |
|---|---|---|---|
| f [mm] | 4.03 | |R1/f| | 0.42 |
| Fno | 2.15 | f/R3 | 2.12 |
| HFOV [deg.] | 37.5 | R12/f | 0.30 |
| V5/(V3 + V4) | 1.19 | |f/f2| + |f/f3| | 2.40 |
| CT2/(T12 + T23) | 1.75 | |f/f5| + |f/f6| | 4.18 |
| CT5/CT6 | 1.11 | | |
| CT1/|Sag12| | 1.76 | | |

7th Embodiment

Figure 7A:
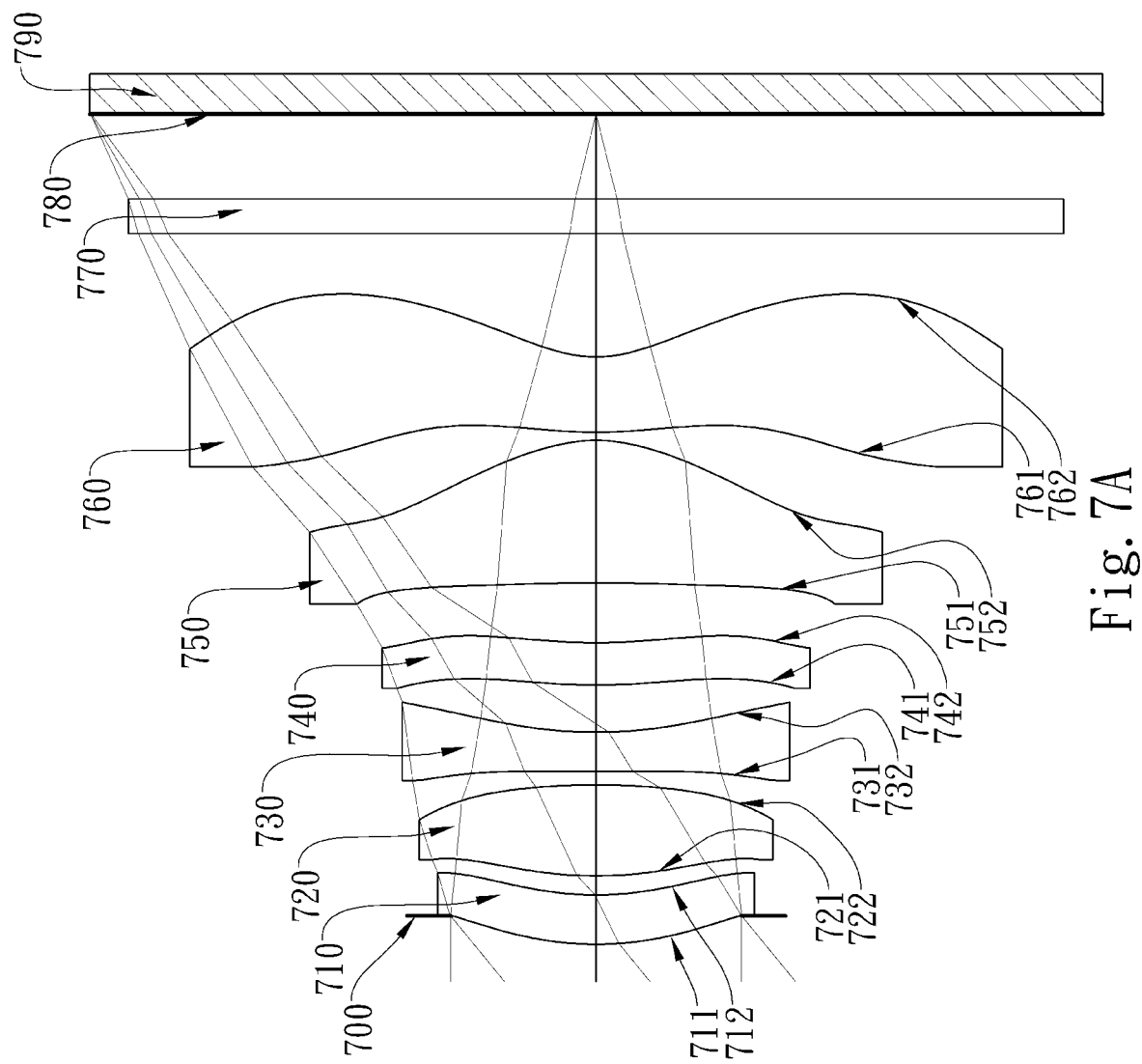
FIG. 7A is a schematic view of an image capturing device according to the 7th embodiment of the present disclosure.
Figure 7B:
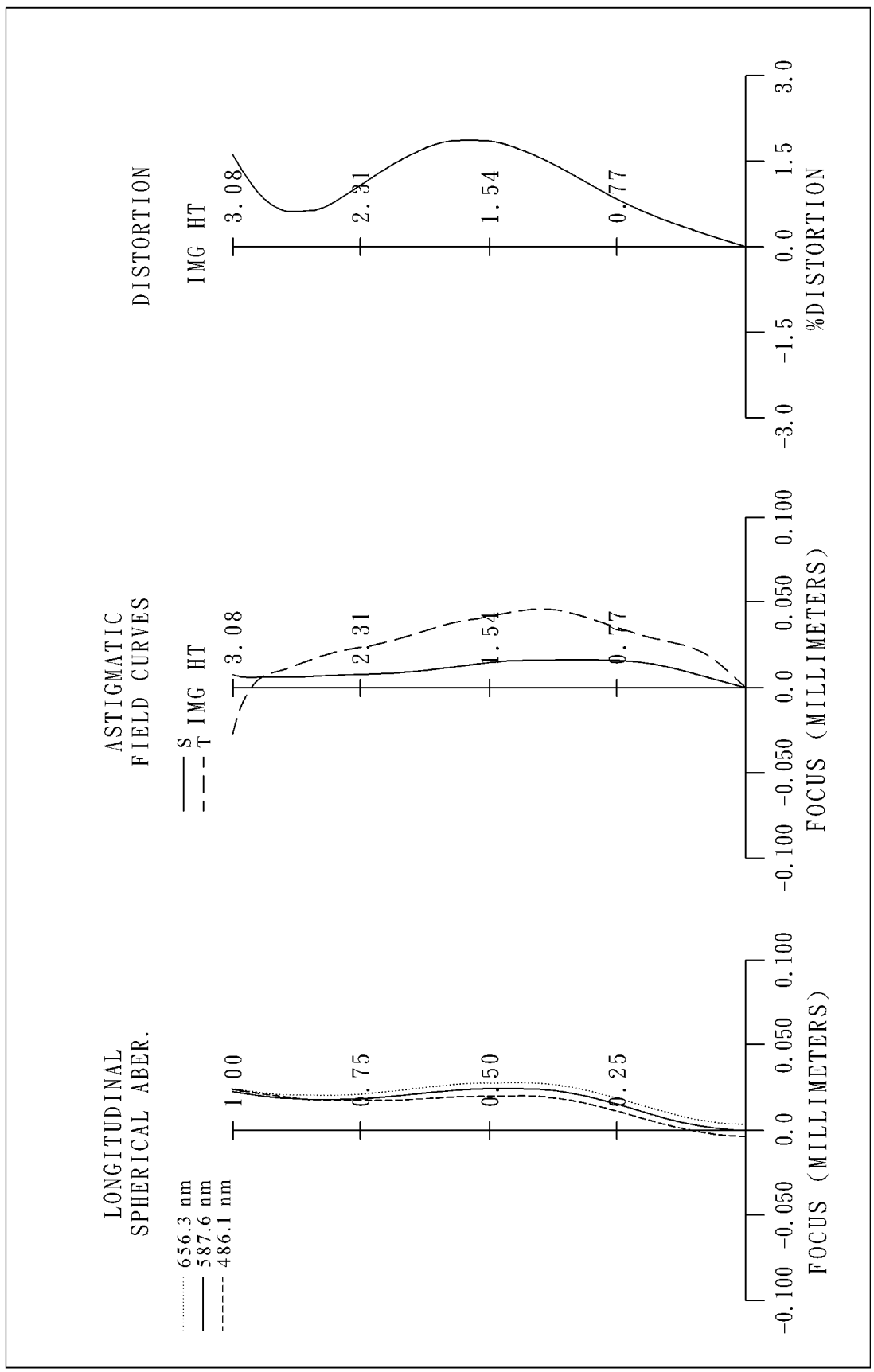
FIG. 7B shows longitudinal spherical aberration curves, astigmatic field curves and a distortion curve of the image capturing device according to the 7th embodiment.

FIG. 7A is a schematic view of an image capturing device according to the 7th embodiment of the present disclosure. FIG. 7B shows, in order from left to right, longitudinal spherical aberration curves, astigmatic field curves and a distortion curve of the image capturing device according to the 7th embodiment.

In FIG. 7A, the image capturing device includes an image capturing optical lens assembly (not otherwise herein labeled) of the present disclosure and an image sensor 790. The image capturing optical lens assembly includes, in order from an object side to an image side, a first lens element 710, a second lens element 720, a third lens element 730, a fourth lens element 740, a fifth lens element 750, and a sixth lens element 760, wherein the image capturing optical lens assembly has a total of six lens elements (710-760) with refractive power.

The first lens element 710 with positive refractive power has an object-side surface 711 being convex in a paraxial region thereof and an image-side surface 712 being concave in a paraxial region thereof, which are both aspheric, and the first lens element 710 is made of plastic material.

The second lens element 720 with positive refractive power has an object-side surface 721 being convex in a paraxial region thereof and an image-side surface 722 being convex in a paraxial region thereof, which are both aspheric, and the second lens element 720 is made of plastic material.

The third lens element 730 with negative refractive power has an object-side surface 731 being concave in a paraxial region thereof and an image-side surface 732 being concave in a paraxial region thereof, which are both aspheric, and the third lens element 730 is made of plastic material. Furthermore, the object-side surface 731 of the third lens element 730 has at least one inflection point.

The fourth lens element 740 with positive refractive power has an object-side surface 741 being convex in a paraxial region thereof and an image-side surface 742 being concave in a paraxial region thereof, which are both aspheric, and the fourth lens element 740 is made of plastic material. Furthermore, the image-side surface 742 of the fourth lens element 740 has at least one convex shape in an off-axis region thereof.

The fifth lens element 750 with positive refractive power has an object-side surface 751 being concave in a paraxial region thereof and an image-side surface 752 being convex in a paraxial region thereof, which are both aspheric, and the fifth lens element 750 is made of plastic material.

The sixth lens element 760 with negative refractive power has an object-side surface 761 being convex in a paraxial region thereof and an image-side surface 762 being concave in a paraxial region thereof, which are both aspheric, and the sixth lens element 760 is made of plastic material.

The image capturing optical lens assembly further includes an aperture stop 700 and an IR-cut filter 770. The aperture stop 700 is disposed between an imaged object and the first lens element 710. The IR-cut filter 770 is made of glass and located between the sixth lens element 760 and an image surface 780, and will not affect the focal length of the image capturing optical lens assembly.

The image sensor 790 is disposed on or near the image surface 780 of the image capturing optical lens assembly.

The detailed optical data of the seventh embodiment are shown in TABLE 18, and the aspheric surface data are shown in TABLE 19, wherein the units of the curvature radius, the thickness and the focal length are expressed in mm, and HFOV is half of the maximal field of view.

TABLE 18

(Embodiment 7)
f = 3.68 mm, Fno = 2.08, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.173 | | | | |
| 2 | Lens 1 | 1.899 | ASP | 0.300 | Plastic | 1.544 | 55.9 | 122.76 |
| 3 | | 1.846 | ASP | 0.116 | | | | |
| 4 | Lens 2 | 2.300 | ASP | 0.554 | Plastic | 1.544 | 55.9 | 2.78 |
| 5 | | −4.035 | ASP | 0.081 | | | | |
| 6 | Lens 3 | −38.337 | ASP | 0.240 | Plastic | 1.633 | 23.4 | −4.10 |
| 7 | | 2.790 | ASP | 0.286 | | | | |
| 8 | Lens 4 | 3.425 | ASP | 0.258 | Plastic | 1.633 | 23.4 | 1256.25 |
| 9 | | 3.340 | ASP | 0.364 | | | | |
| 10 | Lens 5 | −9.692 | ASP | 0.867 | Plastic | 1.544 | 55.9 | 1.85 |
| 11 | | −0.942 | ASP | 0.050 | | | | |
| 12 | Lens 6 | 2.933 | ASP | 0.458 | Plastic | 1.530 | 55.8 | −1.94 |
| 13 | | 0.720 | ASP | 0.750 | | | | |
| 14 | IR-cut filter | Plano | | 0.210 | Glass | 1.517 | 64.2 | |
| 15 | | Plano | | 0.517 | | | | |
| 16 | Image Surface | Plano | | — | | | | |

Note:
Reference wavelength is d-line 587.6 nm

TABLE 19

Aspheric Coefficients

| Surface # | | | | | |
|---|---|---|---|---|---|
| 2 | 3 | 4 | 5 | 6 | 7 |

| | | | | | |
|---|---|---|---|---|---|
| k = | −9.5669E−01 | −2.2189E+00 | −9.9136E+00 | −5.9386E+01 | 9.0000E+01 | 3.4245E+00 |
| A4 = | −3.9422E−02 | −9.3177E−02 | 1.0236E−02 | −1.3459E−02 | 1.2391E−01 | −8.7816E−03 |
| A6 = | 3.6432E−03 | 2.3632E−02 | −6.0008E−02 | −1.9883E−01 | −4.3066E−01 | −1.2269E−01 |
| A8 = | −5.6239E−03 | −6.4246E−02 | −3.4128E−02 | 1.7984E−01 | 4.4249E−01 | 1.0769E−01 |
| A10 = | −1.5854E−02 | 1.5019E−02 | 1.8394E−02 | −5.9817E−02 | −2.0518E−01 | −5.6384E−02 |
| A12 = | 1.5100E−04 | −7.1739E−04 | −3.5962E−04 | 3.8510E−04 | 4.0032E−02 | 1.0816E−02 |
| A14 = | −2.9618E−12 | 4.2165E−12 | −8.4906E−04 | 3.1939E−04 | 5.3024E−05 | 5.6840E−06 |
| A16 = | −3.0325E−13 | 5.8639E−13 | −1.3039E−12 | 2.4245E−12 | 1.5149E−04 | −2.1479E−05 |

| Surface # | | | | | |
|---|---|---|---|---|---|
| 8 | 9 | 10 | 11 | 12 | 13 |

| | | | | | |
|---|---|---|---|---|---|
| k = | −4.7361E+01 | −2.0709E+01 | −4.6097E+00 | −5.6391E+00 | 1.4561E−01 | −4.5463E+00 |
| A4 = | −5.3418E−02 | −9.5577E−02 | 7.8529E−02 | −1.0613E−01 | −2.1438E−01 | −8.9370E−02 |
| A6 = | −2.5685E−02 | 2.3691E−02 | −1.2547E−01 | 1.2850E−01 | 7.8166E−02 | 3.4161E−02 |
| A8 = | 6.2631E−03 | −1.9846E−02 | 1.3612E−01 | −1.2213E−01 | −2.2919E−02 | −1.0138E−02 |
| A10 = | 1.1778E−02 | −1.2449E−02 | −9.6794E−02 | 9.4158E−02 | 8.2159E−03 | 1.9611E−03 |
| A12 = | −5.2422E−03 | 2.2092E−02 | 3.6505E−02 | −4.0036E−02 | −2.2675E−03 | −2.3819E−04 |
| A14 = | −2.5121E−06 | −5.6189E−03 | −5.4061E−03 | 8.2931E−03 | 3.2862E−04 | 1.6232E−05 |
| A16 = | −6.5874E−06 | −9.2016E−06 | −1.4484E−04 | −6.6813E−04 | −1.8730E−05 | −4.4817E−07 |

In the 7th embodiment, the equation of the aspheric surface profiles of the aforementioned lens elements is the same as the equation of the 1st embodiment. Also, the definitions of these parameters shown in Table 20 below are the same as those stated in the 1st embodiment with corresponding values for the 7th embodiment, so an explanation in this regard will not be provided again.

Moreover, these parameters can be calculated from Table 18 and Table 19 and satisfy the conditions stated in Table 20.

TABLE 20

7$^{th}$ Embodiment

| f [mm] | 3.68 | |R1/f| | 0.52 |
| Fno | 2.08 | f/R3 | 1.60 |

TABLE 20-continued

7$^{th}$ Embodiment

| HFOV [deg.] | 39.3 | R12/f | 0.20 |
| V5/(V3 + V4) | 1.19 | |f/f2| + |f/f3| | 2.22 |
| CT2/(T12 + T23) | 2.81 | |f/f5| + |f/f6| | 3.89 |
| CT5/CT6 | 1.89 | | |
| CT1/|Sag12| | 2.23 | | |

8th Embodiment

Figure 8A:
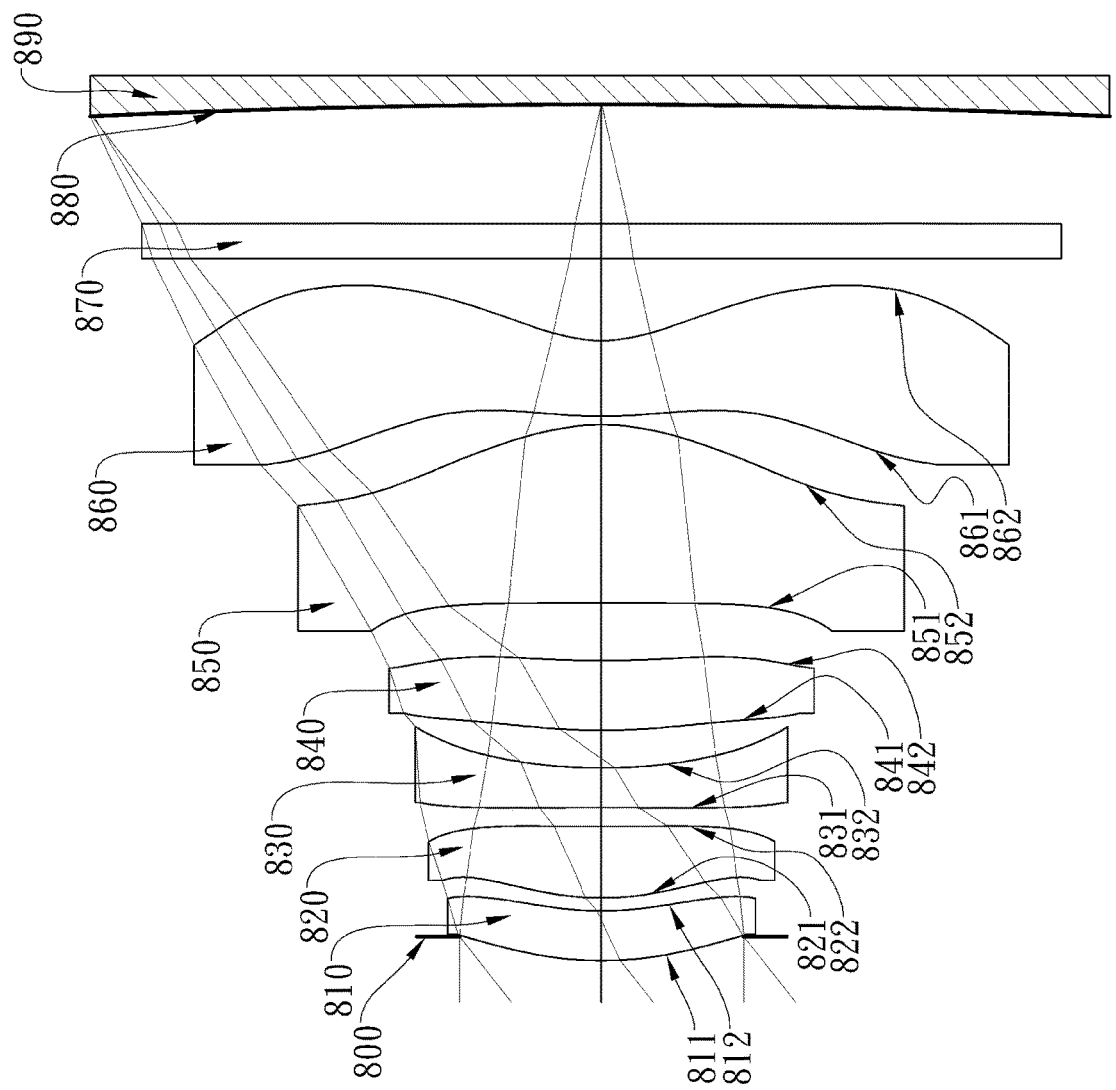
FIG. 8A is a schematic view of an image capturing device according to the 8th embodiment of the present disclosure.
Figure 8B:
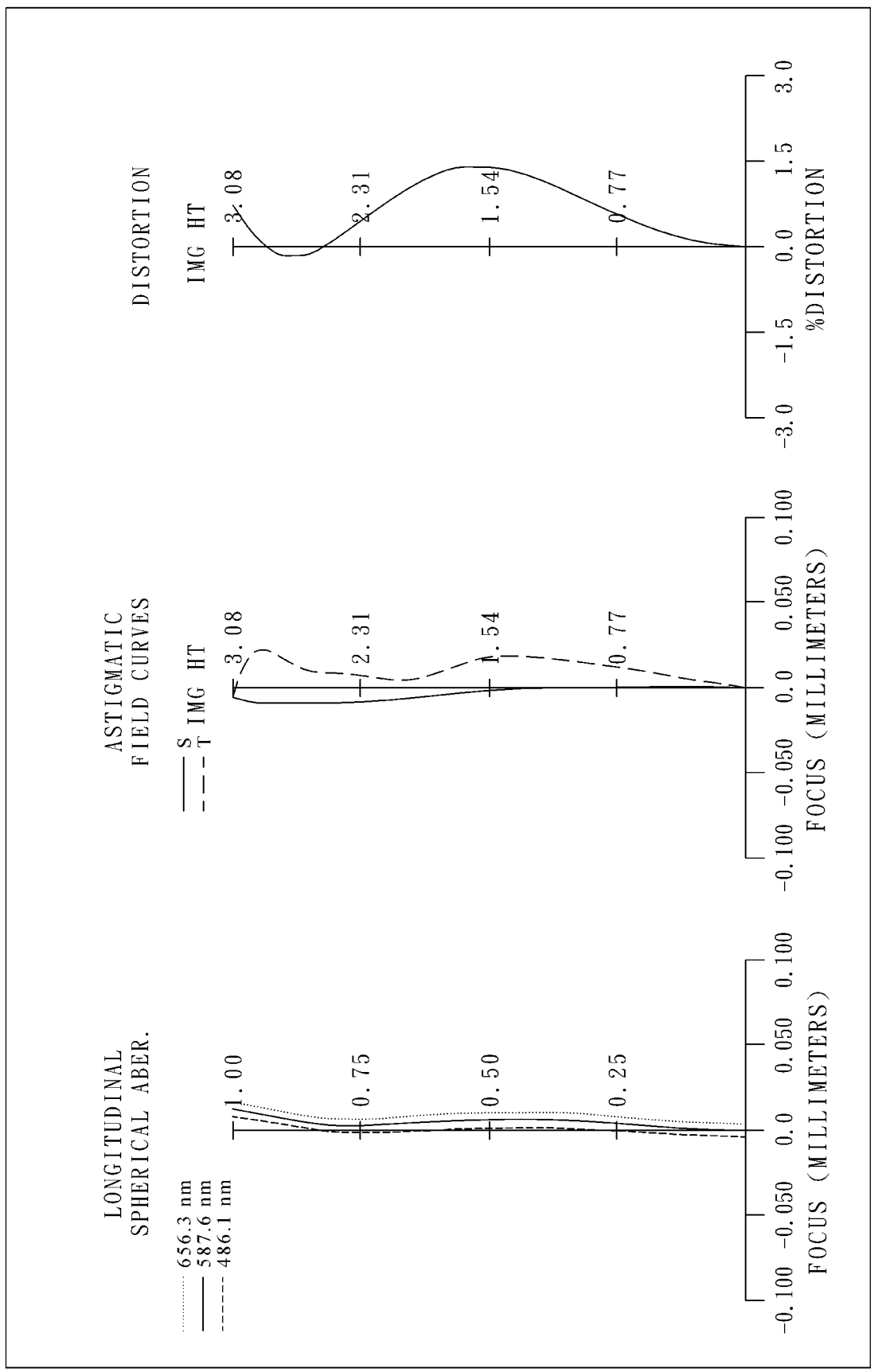
FIG. 8B shows longitudinal spherical aberration curves, astigmatic field curves and a distortion curve of the image capturing device according to the 8th embodiment.

FIG. 8A is a schematic view of an image capturing device according to the 8th embodiment of the present disclosure. FIG. 8B shows, in order from left to right, longitudinal spherical aberration curves, astigmatic field curves and a distortion curve of the image capturing device according to the 8th embodiment.

In FIG. 8A, the image capturing device includes an image capturing optical lens assembly (not otherwise herein labeled) of the present disclosure and an image sensor 890. The image capturing optical lens assembly includes, in order from an object side to an image side, a first lens element 810, a second lens element 820, a third lens element 830, a fourth lens element 840, a fifth lens element 850, and a sixth lens element 860, wherein the image capturing optical lens assembly has a total of six lens elements (810-860) with refractive power.

The first lens element 810 with negative refractive power has an object-side surface 811 being convex in a paraxial region thereof and an image-side surface 812 being concave in a paraxial region thereof, which are both aspheric, and the first lens element 810 is made of plastic material.

The second lens element 820 with positive refractive power has an object-side surface 821 being convex in a paraxial region thereof and an image-side surface 822 being concave in a paraxial region thereof, which are both aspheric, and the second lens element 820 is made of plastic material.

The third lens element 830 with negative refractive power has an object-side surface 831 being concave in a paraxial region thereof and an image-side surface 832 being concave in a paraxial region thereof, which are both aspheric, and the third lens element 830 is made of plastic material. Furthermore, the object-side surface 831 of the third lens element 830 has at least one inflection point.

The fourth lens element 840 with positive refractive power has an object-side surface 841 being convex in a paraxial region thereof and an image-side surface 842 being concave in a paraxial region thereof, which are both aspheric, and the fourth lens element 840 is made of plastic material. Furthermore, the image-side surface 842 of the fourth lens element 840 has at least one convex shape in an off-axis region thereof.

The fifth lens element 850 with positive refractive power has an object-side surface 851 being concave in a paraxial region thereof and an image-side surface 852 being convex in a paraxial region thereof, which are both aspheric, and the fifth lens element 850 is made of plastic material.

The sixth lens element 860 with negative refractive power has an object-side surface 861 being convex in a paraxial region thereof and an image-side surface 862 being concave in a paraxial region thereof, which are both aspheric, and the sixth lens element 860 is made of plastic material. Furthermore, the image-side surface 862 of the sixth lens element 860 has at least one convex shape in an off-axis region thereof.

The image capturing optical lens assembly further includes an aperture stop 800 and an IR-cut filter 870. The aperture stop 800 is disposed between an imaged object and the first lens element 810. The IR-cut filter 870 is made of glass and located between the sixth lens element 860 and an image surface 880, and will not affect the focal length of the image capturing optical lens assembly.

The image sensor 890 is disposed on or near the image surface 880 of the image capturing optical lens assembly.

The detailed optical data of the eighth embodiment are shown in TABLE 21, and the aspheric surface data are shown in TABLE 22, wherein the units of the curvature radius, the thickness and the focal length are expressed in mm, and HFOV is half of the maximal field of view.

TABLE 21

(Embodiment 8)
f = 3.92 mm, Fno = 2.28, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.145 | | | | |
| 2 | Lens 1 | 2.105 | ASP | 0.300 | Plastic | 1.544 | 55.9 | −37.93 |
| 3 | | 1.814 | ASP | 0.078 | | | | |
| 4 | Lens 2 | 1.550 | ASP | 0.437 | Plastic | 1.544 | 55.9 | 2.89 |
| 5 | | 100.000 | ASP | 0.114 | | | | |
| 6 | Lens 3 | −17.344 | ASP | 0.240 | Plastic | 1.640 | 23.5 | −4.67 |
| 7 | | 3.634 | ASP | 0.228 | | | | |
| 8 | Lens 4 | 3.479 | ASP | 0.422 | Plastic | 1.544 | 55.9 | 17.79 |
| 9 | | 5.198 | ASP | 0.348 | | | | |
| 10 | Lens 5 | −39.154 | ASP | 1.084 | Plastic | 1.544 | 55.9 | 2.32 |
| 11 | | −1.235 | ASP | 0.050 | | | | |
| 12 | Lens 6 | 3.049 | ASP | 0.457 | Plastic | 1.544 | 55.9 | −2.25 |
| 13 | | 0.828 | ASP | 0.500 | | | | |
| 14 | IR-cut filter | Plano | | 0.210 | Glass | 1.517 | 64.2 | |
| 15 | | Plano | | 0.724 | | | | |
| 16 | Image Surface | −66.000 | | — | | | | |

Note:
Reference wavelength is d-line 587.6 nm

TABLE 22

Aspheric Coefficients

| Surface # | | | | | |
|---|---|---|---|---|---|
| 2 | 3 | 4 | 5 | 6 | 7 |
| k = | −1.4899E+00 | −9.8839E+00 | −6.8085E+00 | 9.0000E+01 | −9.0000E+01 | 6.1144E+00 |
| A4 = | −4.5205E−02 | −1.2247E−01 | −3.2748E−02 | 4.9659E−02 | 1.3790E−01 | 5.3820E−02 |
| A6 = | 5.1197E−02 | 6.0345E−02 | −7.3451E−02 | −2.4952E−01 | −3.3291E−01 | −1.0592E−01 |
| A8 = | −4.0943E−02 | −6.6411E−02 | 1.2284E−03 | 2.1260E−01 | 4.2570E−01 | 1.1785E−01 |
| A10 = | −8.6014E−03 | −5.0626E−03 | −3.0791E−02 | −8.5375E−02 | −2.3612E−01 | −5.9685E−02 |
| A12 = | 1.5100E−04 | −7.1739E−04 | −3.5962E−04 | 3.8509E−04 | 4.7718E−02 | 1.1319E−02 |
| A14 = | −1.2201E−12 | 7.0003E−12 | −8.4906E−04 | 3.1939E−04 | 5.3133E−05 | 5.2256E−06 |
| A16 = | −2.2709E−13 | 9.4712E−13 | −2.7109E−12 | 4.6755E−12 | 1.5149E−04 | −2.1479E−05 |

| Surface # | | | | | |
|---|---|---|---|---|---|
| 8 | 9 | 10 | 11 | 12 | 13 |
| k = | −4.6730E+01 | −1.5373E+01 | 9.0000E+01 | −7.1106E+00 | 4.9048E−01 | −4.5643E+00 |
| A4 = | −5.4516E−03 | −1.0078E−01 | 4.2271E−02 | −2.3773E−02 | −2.2898E−01 | −1.1128E−01 |
| A6 = | −3.1108E−02 | 3.0750E−02 | −1.2529E−01 | −1.9586E−02 | 6.3251E−02 | 5.3012E−02 |
| A8 = | 6.8351E−03 | −1.5314E−02 | 1.3527E−01 | 3.1412E−02 | 2.0475E−03 | −1.9274E−02 |
| A10 = | 1.7495E−02 | −1.4654E−02 | −9.7150E−02 | −9.8738E−03 | −5.6386E−03 | 4.7017E−03 |
| A12 = | −5.2383E−03 | 2.1011E−02 | 3.6467E−02 | 2.4407E−04 | 1.4705E−03 | −7.3304E−04 |
| A14 = | −2.7941E−06 | −5.2369E−03 | −5.2777E−03 | 3.4269E−04 | −1.6603E−04 | 6.4713E−05 |
| A16 = | −6.5874E−06 | −1.0560E−05 | −1.6489E−04 | −4.3067E−05 | 6.9222E−06 | −2.4059E−06 |

In the 8th embodiment, the equation of the aspheric surface profiles of the aforementioned lens elements is the same as the equation of the 1st embodiment. Also, the definitions of these parameters shown in Table 23 below are the same as those stated in the 1st embodiment with corresponding values for the 8th embodiment, so an explanation in this regard will not be provided again.

Moreover, these parameters can be calculated from Table 21 and Table 22 and satisfy the conditions stated in Table 23.

TABLE 23

| 8$^{th}$ Embodiment | | | |
|---|---|---|---|
| f [mm] | 3.92 | |R1/f| | 0.54 |
| Fno | 2.28 | f/R3 | 2.53 |
| HFOV [deg.] | 38.2 | R12/f | 0.21 |
| V5/(V3 + V4) | 0.70 | |f/f2| + |f/f3| | 2.20 |
| CT2/(T12 + T23) | 2.28 | |f/f5| + |f/f6| | 3.43 |
| CT5/CT6 | 2.37 | | |
| CT1/|Sag12| | 3.96 | | |

9th Embodiment

Figure 9A:
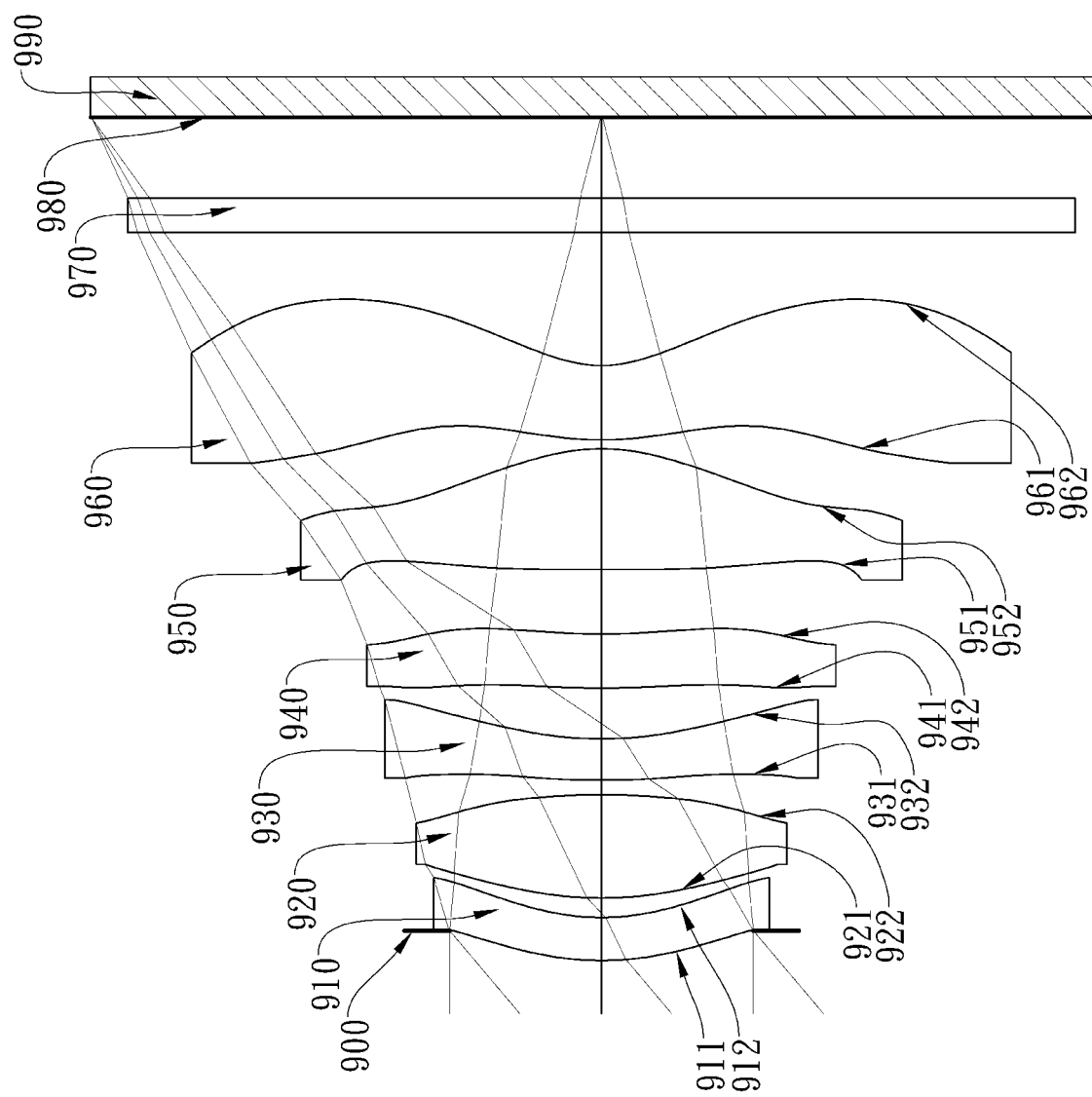
FIG. 9A is a schematic view of an image capturing device according to the 9th embodiment of the present disclosure.
Figure 9B:
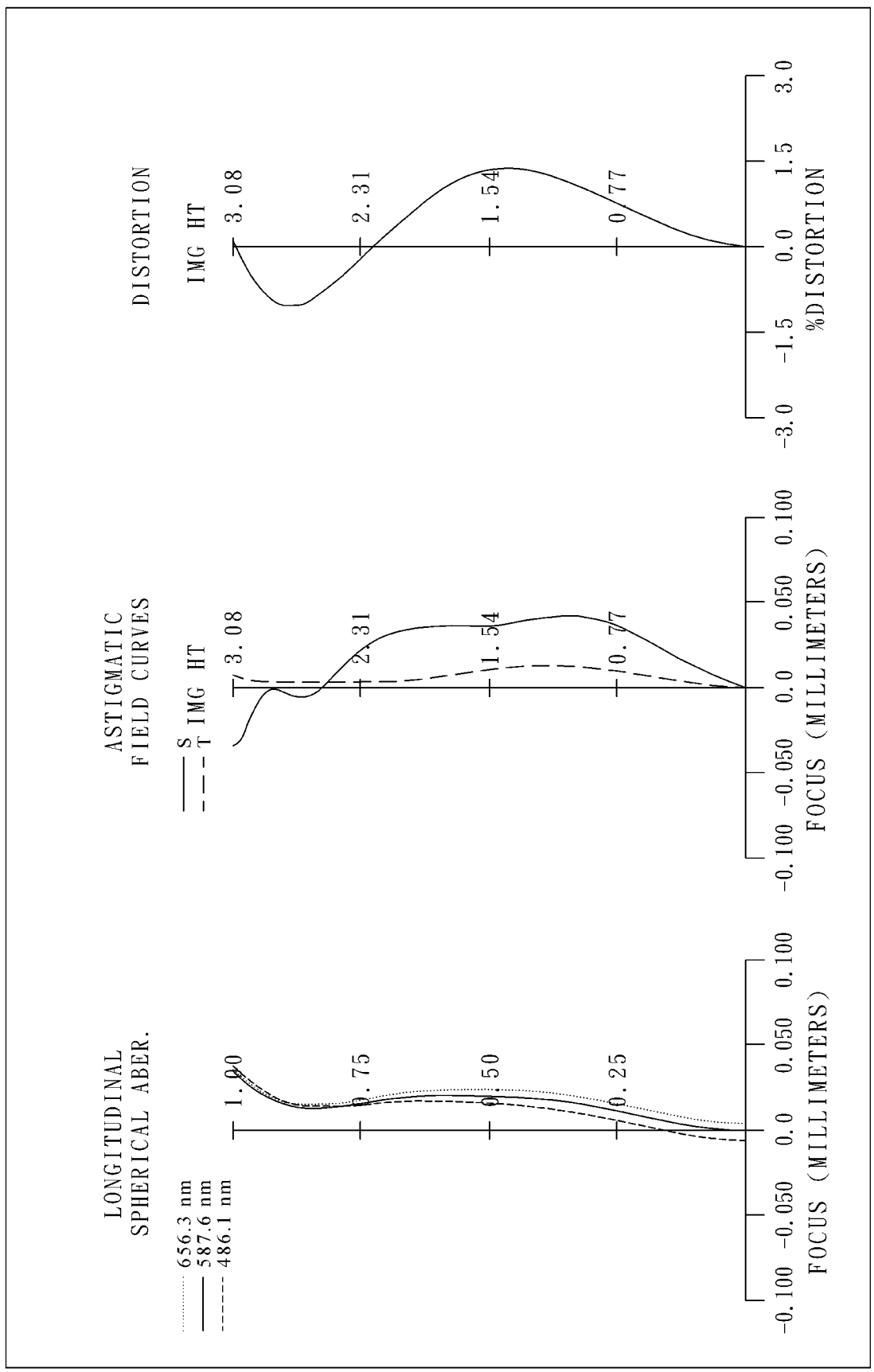
FIG. 9B shows longitudinal spherical aberration curves, astigmatic field curves and a distortion curve of the image capturing device according to the 9th embodiment.

FIG. 9A is a schematic view of an image capturing device according to the 9th embodiment of the present disclosure. FIG. 9B shows, in order from left to right, longitudinal spherical aberration curves, astigmatic field curves and a distortion curve of the image capturing device according to the 9th embodiment.

In FIG. 9A, the image capturing device includes an image capturing optical lens assembly (not otherwise herein labeled) of the present disclosure and an image sensor 990. The image capturing optical lens assembly includes, in order from an object side to an image side, a first lens element 910, a second lens element 920, a third lens element 930, a fourth lens element 940, a fifth lens element 950, and a sixth lens element 960, wherein the image capturing optical lens assembly has a total of six lens elements (910-960) with refractive power.

The first lens element 910 with negative refractive power has an object-side surface 911 being convex in a paraxial region thereof and an image-side surface 912 being concave in a paraxial region thereof, which are both aspheric, and the first lens element 910 is made of plastic material.

The second lens element 920 with positive refractive power has an object-side surface 921 being convex in a paraxial region thereof and an image-side surface 922 being convex in a paraxial region thereof, which are both aspheric, and the second lens element 920 is made of plastic material.

The third lens element 930 with negative refractive power has an object-side surface 931 being convex in a paraxial region thereof and an image-side surface 932 being concave in a paraxial region thereof, which are both aspheric, and the third lens element 930 is made of plastic material. Furthermore, the object-side surface 931 of the third lens element 930 has at least one inflection point.

The fourth lens element 940 with negative refractive power has an object-side surface 941 being convex in a paraxial region thereof and an image-side surface 942 being concave in a paraxial region thereof, which are both aspheric, and the fourth lens element 940 is made of plastic material. Furthermore, the image-side surface 942 of the fourth lens element 940 has at least one convex shape in an off-axis region thereof.

The fifth lens element 950 with positive refractive power has an object-side surface 951 being plano in a paraxial region thereof and an image-side surface 952 being convex in a paraxial region thereof, which are both aspheric, and the fifth lens element 950 is made of plastic material.

The sixth lens element 960 with negative refractive power has an object-side surface 961 being convex in a paraxial region thereof and an image-side surface 962 being concave in a paraxial region thereof, which are both aspheric, and the sixth lens element 960 is made of plastic material. Furthermore, the image-side surface 962 of the sixth lens element 960 has at least one convex shape in an off-axis region thereof.

The image capturing optical lens assembly further includes an aperture stop 900 and an IR-cut filter 970. The aperture stop 900 is disposed between an imaged object and the first lens element 910. The IR-cut filter 970 is made of glass and located between the sixth lens element 960 and an image surface 980, and will not affect the focal length of the image capturing optical lens assembly.

The image sensor 990 is disposed on or near the image surface 980 of the image capturing optical lens assembly.

The detailed optical data of the ninth embodiment are shown in TABLE 24, and the aspheric surface data are shown in TABLE 25, wherein the units of the curvature radius, the thickness and the focal length are expressed in mm, and HFOV is half of the maximal field of view.

TABLE 24

(Embodiment 9)
f = 3.62 mm, Fno = 1.98, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.180 | | | | |
| 2 | Lens 1 | 1.747 | ASP | 0.260 | Plastic | 1.633 | 23.4 | −17.23 |
| 3 | | 1.419 | ASP | 0.117 | | | | |
| 4 | Lens 2 | 2.225 | ASP | 0.622 | Plastic | 1.544 | 55.9 | 2.86 |
| 5 | | −4.663 | ASP | 0.088 | | | | |
| 6 | Lens 3 | 4.938 | ASP | 0.250 | Plastic | 1.633 | 23.4 | −7.00 |
| 7 | | 2.289 | ASP | 0.306 | | | | |
| 8 | Lens 4 | 5.050 | ASP | 0.325 | Plastic | 1.583 | 30.2 | −22.24 |
| 9 | | 3.549 | ASP | 0.389 | | | | |
| 10 | Lens 5 | ∞ | ASP | 0.729 | Plastic | 1.544 | 55.9 | 2.13 |
| 11 | | −1.157 | ASP | 0.053 | | | | |
| 12 | Lens 6 | 1.924 | ASP | 0.449 | Plastic | 1.544 | 55.9 | −2.51 |
| 13 | | 0.733 | ASP | 0.800 | | | | |
| 14 | IR-cut filter | Plano | | 0.210 | Glass | 1.517 | 64.2 | |
| 15 | | Plano | | 0.485 | | | | |
| 16 | Image Surface | Plano | | — | | | | |

Note:
Reference wavelength is d-line 587.6 nm

TABLE 25

Aspheric Coefficients

| | | | Surface # | | | |
|---|---|---|---|---|---|---|
| | 2 | 3 | 4 | 5 | 6 | 7 |
| k = | −1.5406E+00 | −1.4741E+00 | −6.9574E+00 | −9.0000E+01 | −7.7354E+01 | 1.4291E+00 |
| A4 = | −5.9518E−02 | −8.4009E−02 | 3.8285E−02 | −7.5145E−02 | 1.0508E−01 | −2.5999E−02 |
| A6 = | 5.0380E−03 | 1.3010E−04 | −7.6756E−02 | −1.0269E−01 | −4.1895E−01 | −1.4113E−01 |
| A8 = | −2.9733E−03 | 1.3313E−02 | 4.9236E−02 | 1.3593E−01 | 4.4191E−01 | 1.2966E−01 |
| A10 = | −1.3711E−02 | −2.4812E−02 | −8.7498E−03 | −3.4919E−02 | −1.8266E−01 | −4.2303E−02 |
| A12 = | −4.7003E−06 | −1.8784E−06 | −7.1207E−07 | 1.4858E−06 | 2.0534E−02 | 8.0679E−04 |
| A14 = | −4.8754E−07 | −1.2373E−06 | 4.9004E−07 | 2.0374E−06 | −3.2960E−07 | −1.5009E−04 |
| A16 = | −3.8986E−08 | −2.5634E−08 | −2.4542E−07 | 5.7090E−07 | −6.8212E−07 | 4.5550E−07 |

| | | | Surface # | | | |
|---|---|---|---|---|---|---|
| | 8 | 9 | 10 | 11 | 12 | 13 |
| k = | −9.0000E+01 | −7.7593E+00 | 0.0000E+00 | −5.9615E+00 | −4.6525E−01 | −3.6454E+00 |
| A4 = | −7.7485E−02 | −1.4523E−01 | 9.3359E−02 | −9.2801E−03 | −2.5153E−01 | −1.1884E−01 |
| A6 = | −2.2953E−02 | 2.1720E−02 | −8.8561E−02 | 2.0840E−02 | 6.2415E−02 | 5.1561E−02 |
| A8 = | 1.1669E−01 | 5.1752E−02 | 4.2159E−02 | −1.7276E−02 | −5.0257E−03 | −1.6872E−02 |
| A10 = | −1.6451E−01 | −1.0054E−01 | −4.9625E−03 | 2.2422E−02 | 2.1098E−03 | 3.8037E−03 |
| A12 = | 1.3794E−01 | 7.7829E−02 | −8.1567E−03 | −1.1801E−02 | −1.3193E−03 | −5.5778E−04 |
| A14 = | −5.4488E−02 | −2.4154E−02 | 4.6838E−03 | 2.4895E−03 | 2.6217E−04 | 4.6576E−05 |
| A16 = | 7.4997E−03 | 2.3888E−03 | −8.5860E−04 | −1.8221E−04 | −1.7122E−05 | −1.6371E−06 |

In the 9th embodiment, the equation of the aspheric surface profiles of the aforementioned lens elements is the same as the equation of the 1st embodiment. Also, the definitions of these parameters shown in Table 26 below are the same as those stated in the 1st embodiment with corresponding values for the 9th embodiment, so an explanation in this regard will not be provided again.

Moreover, these parameters can be calculated from Table 24 and Table 25 and satisfy the conditions stated in Table 26.

TABLE 26

| | 9$^{th}$ Embodiment | | |
|---|---|---|---|
| f [mm] | 3.62 | |R1/f| | 0.48 |
| Fno | 1.98 | f/R3 | 1.63 |

TABLE 26-continued

| | 9$^{th}$ Embodiment | | |
|---|---|---|---|
| HFOV [deg.] | 40.2 | R12/f | 0.20 |
| V5/(V3 + V4) | 1.04 | |f/f2| + |f/f3| | 1.78 |

TABLE 26-continued

| 9th Embodiment | | | |
|---|---|---|---|
| CT2/(T12 + T23) | 3.03 | \|f/f5\| + \|f/f6\| | 3.14 |
| CT5/CT6 | 1.62 | | |
| CT1/\|Sag12\| | 1.08 | | |

The foregoing description, for purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens assembly comprising six lens elements, the six lens elements being, in order from an object side to an image side:
   a first lens element;
   a second lens element;
   a third lens element having an object-side surface with at least one inflection point and an image-side surface being concave in a paraxial region thereof;
   a fourth lens element;
   a fifth lens element; and
   a sixth lens element having an image-side surface being concave in a paraxial region thereof and having at least one convex shape in an off-axis region thereof;
   wherein an absolute value of a curvature radius of an object-side surface of the first lens element is larger than an absolute value of a curvature radius of an image-side surface of the first lens element, and a central thickness of the second lens element is larger than a central thickness of the fifth lens element;
   wherein an Abbe number of the fifth lens element is V5, an Abbe number of the third lens element is V3, an Abbe number of the fourth lens element is V4, a central thickness of the fifth lens element is CT5, a central thickness of the sixth lens element is CT6, a curvature radius of the image-side surface of the sixth lens element is R12, a focal length of the image capturing optical lens assembly is f, and the following conditions are satisfied:

$1.0 < V5/(V3+V4) < 1.5$;

$1.13 \leq CT5/CT6$; and $0 < R12/f < 0.40$.

2. The image capturing optical lens assembly of claim 1, wherein the first lens element has negative refractive power.

3. The image capturing optical lens assembly of claim 1, wherein the Abbe number of the fifth lens element is V5, the Abbe number of the third lens element is V3, the Abbe number of the fourth lens element is V4, and the following condition is satisfied:

$1.19 \leq V5/(V3+V4) < 1.5$.

4. The image capturing optical lens assembly of claim 1, wherein the focal length of the image capturing optical lens assembly is f, a focal length of the fifth lens element is f5, a focal length of the sixth lens element is f6, and the following condition is satisfied:

$1.50 < |f/f5| + |f/f6|$.

5. The image capturing optical lens assembly of claim 1, wherein the focal length of the image capturing optical lens assembly is f, a focal length of the second lens element is f2, a focal length of the third lens element is f3, and the following condition is satisfied:

$2.20 < |f/f2| + |f/f3|$.

6. The image capturing optical lens assembly of claim 1, wherein the second lens element has positive refractive power, the third lens element has negative refractive power, the fifth lens element has positive refractive power, the sixth lens element has negative refractive power, an f-number of the image capturing optical lens assembly is Fno, and the following condition is satisfied:

$1.6 < Fno < 2.5$.

7. The image capturing optical lens assembly of claim 1, wherein a curvature radius of an object-side surface of the second lens element is R3, the focal length of the imaging capturing lens assembly is f, and the following condition is satisfied:

$1.40 < f/R3$.

8. The image capturing optical lens assembly of claim 1, wherein the fourth lens element has negative refractive power.

9. The image capturing optical lens assembly of claim 1, wherein the first lens element has positive refractive power.

10. The image capturing optical lens assembly of claim 1, wherein an absolute value of a curvature radius of an object-side surface of the fourth lens element is larger than an absolute value of a curvature radius of an image-side surface of the fourth lens element.

11. The image capturing optical lens assembly of claim 1, wherein the central thickness of the second lens element is the largest among central thicknesses of the six lens elements.

12. An image capturing optical lens assembly comprising six lens elements, the six lens elements being, in order from an object side to an image side:
    a first lens element;
    a second lens element;
    a third lens element having an object-side surface with at least one inflection point and an image-side surface being concave in a paraxial region thereof;
    a fourth lens element having positive refractive power;
    a fifth lens element; and
    a sixth lens element having an image-side surface being concave in a paraxial region thereof and having at least one convex shape in an off-axis region thereof;
    wherein an Abbe number of the fifth lens element is V5, an Abbe number of the third lens element is V3, an Abbe number of the fourth lens element is V4, a central thickness of the fifth lens element is CT5, a central thickness of the sixth lens element is CT6, a focal length of the image capturing optical lens assembly is f, a focal length of the second lens element is f2, a focal length of the third lens element is f3, a curvature radius of the image-side surface of the sixth lens element is R12 and the following conditions are satisfied:

$1.0 < V5/(V3+V4) < 1.5;$ $1.27 \le CT5/CT6;$ $0 < R12/f < 0.40;$ and $2.20 < |f/f2| + |f/f3|.$ 13. The image capturing optical lens assembly of claim 12, wherein the second lens element has positive refractive power, the third lens element has negative refractive power, an f-number of the image capturing optical lens assembly is Fno, and the following condition is satisfied:

$1.6 < Fno < 2.5.$

14. The image capturing optical lens assembly of claim 12, wherein a curvature radius of an object-side surface of the second lens element is R3, the focal length of the imaging capturing lens assembly is f, and the following condition is satisfied:

$1.40 < f/R3.$

15. The image capturing optical lens assembly of claim 12, wherein the focal length of the image capturing optical lens assembly is f, a focal length of the fifth lens element is f5, a focal length of the sixth lens element is f6, and the following condition is satisfied:

$1.50 < |f/f5| + |f/f6|.$

16. The image capturing optical lens assembly of claim 12, wherein the second lens element has an object-side surface being convex in a paraxial region thereof and an image-side surface being convex in a paraxial region thereof, the fifth lens element has an object-side surface being concave in a paraxial region thereof and an image-side surface being convex in a paraxial region thereof, and the sixth lens element has an object-side surface being convex in a paraxial region thereof.

17. The image capturing optical lens assembly of claim 12, wherein a central thickness of the second lens element is the largest among central thicknesses of the six lens elements.

18. An image capturing device, comprising:
the image capturing optical lens assembly of claim 14; and
an image sensor, wherein the image sensor is disposed on an image surface of the image capturing optical lens assembly.

19. An electronic device, comprising:
the image capturing device of claim 18.

20. An image capturing optical lens assembly comprising six lens elements, the six lens elements being, in order from an object side to an image side:
a first lens element;
a second lens element;
a third lens element having an image-side surface being concave in a paraxial region thereof;
a fourth lens element;
a fifth lens element; and
a sixth lens element having an image-side surface being concave in a paraxial region thereof and having at least one convex shape in an off-axis region thereof;
wherein an absolute value of a curvature radius of an object-side surface of the fourth lens element is larger than an absolute value of a curvature radius of an image-side surface of the third lens element, and a central thickness of the second lens element is larger than a central thickness of the fifth lens element;
wherein an Abbe number of the fifth lens element is V5, an Abbe number of the third lens element is V3, an Abbe number of the fourth lens element is V4, a central thickness of the fifth lens element is CT5, a central thickness of the sixth lens element is CT6, a focal length of the image capturing optical lens assembly is f, a curvature radius of the image-side surface of the sixth lens element is R12, an f-number of the image capturing optical lens assembly is Fno and the following conditions are satisfied:

$1.0 < V5/(V3+V4) < 1.5;$ $1.13 \le CT5/CT6;$ $0 < R12/f < 0.40;$ and $1.6 < Fno < 2.5.$ 21. The image capturing optical lens assembly of claim 20, wherein the focal length of the image capturing optical lens assembly is f, a focal length of the fifth lens element is f5, a focal length of the sixth lens element is f6, and the following condition is satisfied:

$2.50 < |f/f5| + |f/f6| < 5.0.$

22. The image capturing optical lens assembly of claim 20, wherein the second lens element has an object-side surface being convex in a paraxial region thereof and an image-side surface being convex in a paraxial region thereof, the fifth lens element has an object-side surface being concave in a paraxial region thereof and an image-side surface being convex in a paraxial region thereof, and the sixth lens element has an object-side surface being convex in a paraxial region thereof.

23. The image capturing optical lens assembly of claim 20, wherein the central thickness of the second lens element is the largest among central thicknesses of the six lens elements.

24. The image capturing optical lens assembly of claim 20, wherein the focal length of the image capturing optical lens assembly is f, a focal length of the second lens element is f2, a focal length of the third lens element is f3 and the following condition is satisfied:

$2.20 < |f/f2| + |f/f3|.$

25. An image capturing device, comprising:
the image capturing optical lens assembly of claim 20; and
an image sensor, wherein the image sensor is disposed on an image surface of the image capturing optical lens assembly.

26. An electronic device, comprising:
the image capturing device of claim 25.

* * * * *